United States Patent
Andrade Dias et al.

(10) Patent No.: US 11,135,894 B2
(45) Date of Patent: Oct. 5, 2021

(54) SYSTEM AND METHOD FOR MANAGING POWER AND EFFICIENTLY SOURCING A VARIABLE VOLTAGE FOR A TRANSPORT CLIMATE CONTROL SYSTEM

(71) Applicant: THERMO KING CORPORATION, Minneapolis, MN (US)

(72) Inventors: Marcelo Andrade Dias, Lakeville, MN (US); Ryan Wayne Schumacher, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/565,063

(22) Filed: Sep. 9, 2019

(65) Prior Publication Data
US 2021/0070135 A1    Mar. 11, 2021

(51) Int. Cl.
*B60H 1/00* (2006.01)
*B60L 1/00* (2006.01)
(Continued)

(52) U.S. Cl.
CPC .......... *B60H 1/00428* (2013.01); *B60L 1/003* (2013.01); *B60L 3/0046* (2013.01); *B60L 3/04* (2013.01)

(58) Field of Classification Search
CPC ..... B60R 16/023; B60R 16/033; B60R 16/93; G06Q 50/06; G06F 19/00; G01R 21/00;
(Continued)

(56) References Cited

U.S. PATENT DOCUMENTS

| 3,875,483 A | 4/1975 | Farr |
| 5,104,037 A | 4/1992 | Karg et al. |

(Continued)

FOREIGN PATENT DOCUMENTS

| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Rexford N Barnie
*Assistant Examiner* — Jagdeep S Dhillon
(74) *Attorney, Agent, or Firm* — Hamre, Schumann, Mueller & Larson, P.C.

(57) ABSTRACT

A climate control system for use in a transport vehicle is disclosed. The climate control system includes a variable speed electric load, a controller configured to determine a load of the variable speed electric load, and a battery pack voltage configurator circuit. The battery pack voltage configurator circuit includes a first battery bank providing a first voltage and a first current, a second battery bank providing a second voltage and a second current, and a plurality of switches. The controller is configured to control the plurality of switches based on the determined load of the variable speed electric load. The battery pack voltage configurator circuit is configured to provide an output voltage and an output current to drive the variable speed electric load. The output voltage and the output current vary in magnitude based on the control of the plurality of switches.

15 Claims, 11 Drawing Sheets

US 11,135,894 B2

Page 2

(51) Int. Cl.
*B60L 3/00* (2019.01)
*B60L 3/04* (2006.01)

(58) Field of Classification Search
CPC ...... B60L 2200/36; B60L 53/00; B60L 53/22; B60L 53/34
USPC ......... 307/10.1, 9.1, 10.7, 11, 64, 66, 82, 80
See application file for complete search history.

(56) References Cited

U.S. PATENT DOCUMENTS

| | | | |
|---|---|---|---|
| 5,231,849 A | 8/1993 | Rosenblatt | |
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,652,330 B1 | 11/2003 | Wasilewski | |
| 6,688,125 B2 | 2/2004 | Okamoto et al. | |
| 6,753,692 B2 | 6/2004 | Toyomura et al. | |
| 6,925,826 B2 | 8/2005 | Hille et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,400,059 B2 | 7/2008 | Algrain et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,134,339 B2 | 3/2012 | Burlak et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 | 5/2013 | Brabec | |
| 8,476,872 B2 | 7/2013 | Truckenbrod et al. | |
| 8,487,458 B2 | 7/2013 | Steele et al. | |
| 8,541,905 B2 | 9/2013 | Brabec | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,742,620 B1* | 6/2014 | Brennan | H02J 3/381 307/59 |
| 8,760,115 B2 | 6/2014 | Kinser et al. | |
| 8,764,469 B2 | 7/2014 | Lamb | |
| 8,767,379 B2* | 7/2014 | Whitaker | B60L 1/14 361/631 |
| 8,818,588 B2 | 8/2014 | Ambrosio et al. | |
| 8,862,356 B2 | 10/2014 | Miller | |
| 8,912,683 B2 | 12/2014 | Dames et al. | |
| 8,924,057 B2 | 12/2014 | Kinser et al. | |
| 8,978,798 B2 | 5/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabec | |
| 9,147,335 B2 | 9/2015 | Raghunathan et al. | |
| 9,199,543 B2 | 12/2015 | Brabec | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabec | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2003/0201097 A1 | 10/2003 | Zeigler et al. | |
| 2005/0057210 A1 | 3/2005 | Ueda et al. | |
| 2005/0065684 A1 | 3/2005 | Larson et al. | |
| 2006/0284601 A1 | 12/2006 | Salasoo et al. | |
| 2007/0052241 A1 | 3/2007 | Pacy | |
| 2007/0192116 A1 | 8/2007 | Levitt | |
| 2008/0177678 A1 | 7/2008 | Di Martini et al. | |
| 2008/0231211 A1* | 9/2008 | Baarman | H02M 3/33523 315/294 |
| 2008/0281473 A1 | 11/2008 | Pitt | |
| 2009/0121798 A1 | 5/2009 | Levinson | |
| 2009/0122901 A1 | 5/2009 | Choi et al. | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0228155 A1 | 9/2009 | Slifkin et al. | |
| 2009/0314019 A1 | 12/2009 | Fujimoto et al. | |
| 2009/0320515 A1 | 12/2009 | Bischofberger et al. | |
| 2010/0045105 A1 | 2/2010 | Bovio et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0118916 A1* | 5/2011 | Gullichsen | B60K 6/28 701/22 |
| 2011/0162395 A1 | 7/2011 | Chakiachvili et al. | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2011/0265506 A1* | 11/2011 | Alston | F25B 1/10 62/228.3 |
| 2011/0290893 A1 | 12/2011 | Steinberg | |
| 2012/0000212 A1 | 1/2012 | Sanders et al. | |
| 2012/0116931 A1 | 5/2012 | Meyers | |
| 2012/0153722 A1* | 6/2012 | Nazarian | B60L 53/62 307/23 |
| 2012/0198866 A1 | 8/2012 | Zeidner | |
| 2012/0310376 A1 | 12/2012 | Krumm et al. | |
| 2012/0310416 A1 | 12/2012 | Tepper et al. | |
| 2013/0000342 A1 | 1/2013 | Blasko et al. | |
| 2013/0073094 A1 | 3/2013 | Knapton et al. | |
| 2013/0088900 A1 | 4/2013 | Park | |
| 2013/0158828 A1 | 6/2013 | McAlister | |
| 2013/0175975 A1 | 7/2013 | Shinozaki | |
| 2013/0231808 A1 | 9/2013 | Flath et al. | |
| 2014/0018969 A1 | 1/2014 | Forbes, Jr. | |
| 2014/0020414 A1 | 1/2014 | Rusignuolo et al. | |
| 2014/0026599 A1 | 1/2014 | Rusignuolo et al. | |
| 2014/0060097 A1 | 3/2014 | Perreault | |
| 2014/0137590 A1 | 5/2014 | Chopko et al. | |
| 2014/0230470 A1 | 8/2014 | Cook | |
| 2014/0265560 A1 | 9/2014 | Leehey et al. | |

(56) References Cited

U.S. PATENT DOCUMENTS

| | | |
|---|---|---|
| 2015/0019132 A1 | 1/2015 | Gusikhin et al. |
| 2015/0081212 A1 | 3/2015 | Mitchell et al. |
| 2015/0121923 A1 | 5/2015 | Rusignuolo et al. |
| 2015/0168032 A1 | 6/2015 | Steele |
| 2015/0188360 A1 | 7/2015 | Doane et al. |
| 2015/0306937 A1 | 10/2015 | Kitamura et al. |
| 2015/0316301 A1 | 11/2015 | Kolda et al. |
| 2015/0345958 A1 | 12/2015 | Graham |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 | 3/2016 | Keller et al. |
| 2016/0144764 A1 | 5/2016 | Dutta et al. |
| 2016/0252289 A1 | 9/2016 | Feng et al. |
| 2016/0280040 A1 | 9/2016 | Connell et al. |
| 2016/0285416 A1 | 9/2016 | Tiwari et al. |
| 2016/0291622 A1 | 10/2016 | Al-Mohssen et al. |
| 2016/0327921 A1 | 11/2016 | Ribbich et al. |
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0022187 A1 | 1/2018 | Connell et al. |
| 2018/0029436 A1 | 2/2018 | Zaeri et al. |
| 2018/0029488 A1 | 2/2018 | Sjödin |
| 2018/0087813 A1 | 3/2018 | Senf, Jr. |
| 2018/0111441 A1 | 4/2018 | Menard et al. |
| 2018/0154723 A1 | 6/2018 | Anderson et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0306533 A1* | 10/2018 | Alahyari ............... F28F 19/006 |
| 2018/0326813 A1 | 11/2018 | Ganiere |
| 2018/0334012 A1 | 11/2018 | Geller et al. |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0047496 A1* | 2/2019 | Sufrin-Disler ........ B60R 16/033 |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2019/0308487 A1 | 10/2019 | Badger, II et al. |
| 2020/0050753 A1 | 2/2020 | Davis et al. |
| 2020/0076029 A1 | 3/2020 | Litz |
| 2020/0086744 A1 | 3/2020 | Schumacher et al. |
| 2020/0101820 A1* | 4/2020 | Wenger ............... G05D 23/1934 |
| 2020/0130471 A1* | 4/2020 | Leasure ............. B60H 1/00364 |
| 2020/0130473 A1* | 4/2020 | Schumacher ........... B60L 1/003 |
| 2020/0130645 A1* | 4/2020 | Srnec ...................... B60Q 9/00 |
| 2020/0136504 A1* | 4/2020 | Schumacher ...... B60H 1/00428 |
| 2020/0207184 A1* | 7/2020 | Schumacher ............. B60P 3/20 |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 2942216 | 11/2015 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2008/153518 | 12/2008 |
| WO | 2009/155941 | 12/2009 |
| WO | 2010065476 | 6/2010 |
| WO | 2011066468 | 6/2011 |
| WO | 2012/138500 | 10/2012 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016/038838 | 3/2016 |
| WO | 2016145107 | 9/2016 |
| WO | 2017058660 | 4/2017 |
| WO | 2017/083333 | 5/2017 |
| WO | 2017/083336 | 5/2017 |
| WO | 2017/151698 | 9/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018/017450 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |

(56) References Cited

FOREIGN PATENT DOCUMENTS

| WO | 2020068646 | 4/2020 |
| WO | 2020069107 | 4/2020 |

OTHER PUBLICATIONS

"Lamberet Smart Reefer on Solutrans", Zoeken, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,282, titled "Optimized Power Cord for Transferring Power to a Transport Climate Control System", filed Sep. 9, 2019, 43 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/176,720, titled "Methods and Systems for Augmenting a Vehicle powered Transport Climate Control System", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 41 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/911,692, titled "Climate Controlled Vehicle, Transport Climate Control Equipment, Method of Retrofitting a Vehicle and Method of Operation", filed Jun. 25, 2020, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution to Transport Climate Control Systems Amongst One or More Electric Supply Equipment Stations", filed Sep. 9, 2019, 41 pages.

European Patent Application No. 193827763, titled "Mprioritized Power Delivery for Facilitating Transport Climate Control", filed Sep. 9, 2019, 41 pages.

U.S. Appl. No. 16/565,205, titled "Transport Climate Control System With an Accesory Power Distribution Unit for Managing Transport Climate Control Loads", filed Sep. 9, 2019, 54 pages.

U.S. Appl. No. 16/565,235, titled "Interface System for Connecting a Vehicle and a Transport Climate Control System", filed Sep. 9, 2019, 64 pages.

U.S. Appl. No. 16/565,252, titled "Demand-Side Power Distribution Management for a Plurality of Transport Climate Control Systems", filed Sep. 9, 2019, 44 pages.

U.S. Appl. No. 17/015,190, titled "Optimized Power Distribution to Transport Climate Control Systems Amongst One or More Electric Supply Equipment Stations ", filed Sep. 3, 2020, 43 pages.

U.S. Appl. No. 16/147,708, titled "Methods and Systems for Autonomous Climate Control Optimization of a Transport Vehicle", filed Sep. 29, 2018, 41 pages.

U.S. Appl. No. 16/176,667, titled "Drive Off Protection System and Method for Preventing Drive Off", filed Oct. 31, 2018, 41 pages.

U.S. Appl. No. 16/730,126, titled "Transport Climate Control System Power Architecture", filed Dec. 30, 2019, 27 pages.

U.S. Appl. No. 17/015,194, titled "Prioritized Power Delivery for Facilitating Transport Climate Control", filed Sep. 9, 2020, 41 pages.

Peter Els, "Five innovative 800V charging solutions for the next generation of EVs", Automotive IQ, Sep. 12, 2018, 7 pages available at https://www.automotive-iq.com/electrics-electronics/articles/five-innovative-800v-charging-solutions-for-the-next-generation-of-evs.

Partial European Search, issued in the corresponding European patent application No. 20195243.9, dated Nov. 18, 2020, 15 pages.

* cited by examiner

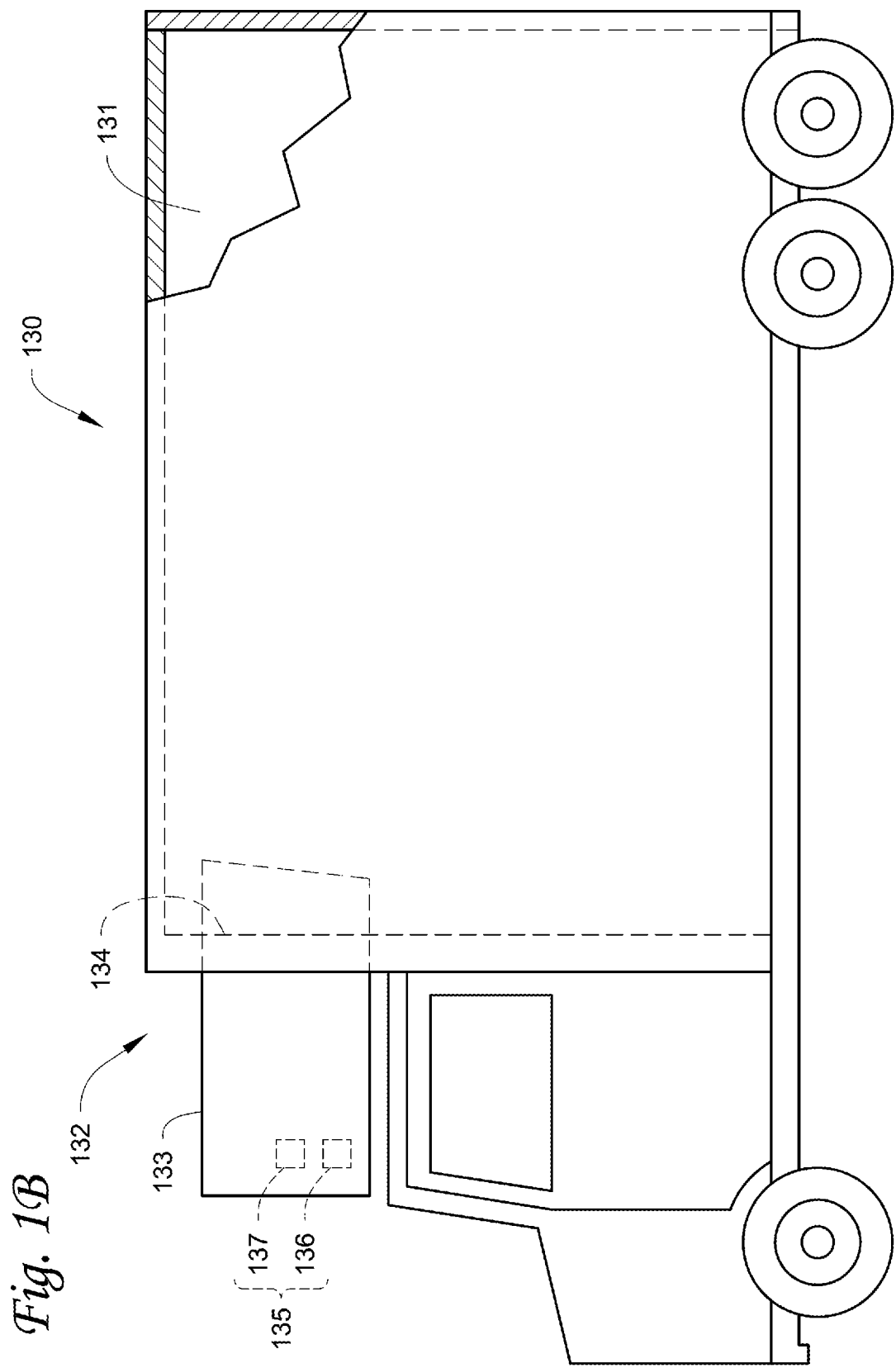

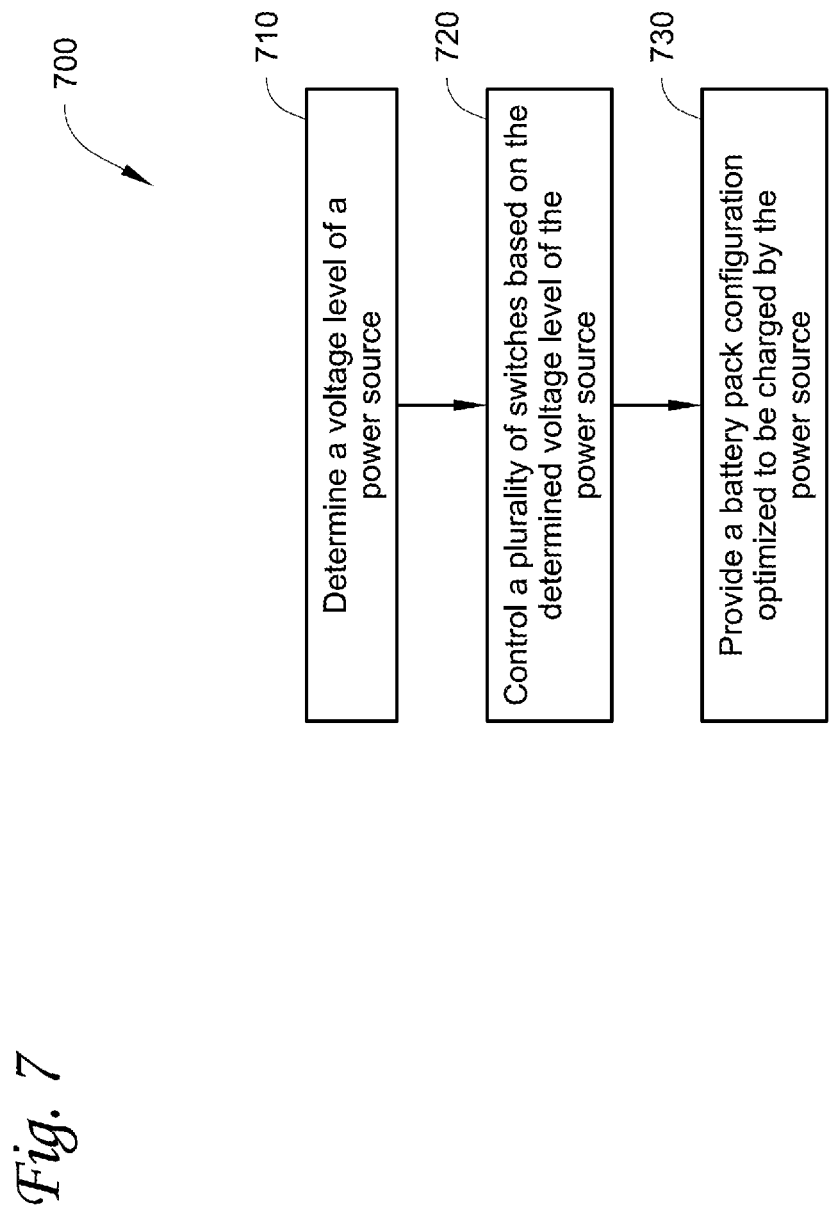

SYSTEM AND METHOD FOR MANAGING POWER AND EFFICIENTLY SOURCING A VARIABLE VOLTAGE FOR A TRANSPORT CLIMATE CONTROL SYSTEM

FIELD

This disclosure relates generally to an electrically powered accessory configured to be used with at least one of a vehicle, trailer, and a transport container. More specifically, the disclosure relates to systems and methods for managing power and efficiently sourcing a configurable direct current (DC) voltage to drive a variable speed electric load through an electrically powered accessory circuit and/or to adapt to an Electrical Supply Equipment (ESE) voltage for charging.

BACKGROUND

A climate control system for a transport unit (e.g., a truck, a container (such as a container on a flat car, an intermodal container, marine container, etc.), a box car, a semi-tractor, a bus, or other similar transport unit), etc. may be included on the transport unit to condition air of a climate controlled space (e.g., internal space, cargo space, etc.) of the transport unit. A climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit. The TRS can maintain environmental condition(s) of the cargo space to maintain cargo (e.g., produce, frozen foods, pharmaceuticals, etc.). In some transport units, the climate control system can be installed externally (e.g., on a rooftop of the transport unit, on a front wall of the transport unit, etc.). The climate control system can provide a desired environment for cargo stored in the transport unit. In some embodiments, the transport unit can include a HVAC system to control a climate within a passenger space of the vehicle (e.g., bus, truck, trailer, etc.).

SUMMARY

This disclosure relates generally to an electrically powered accessory configured to be used with at least one of a vehicle, trailer, and a transport container. More specifically, the disclosure relates to systems and methods for managing power and efficiently sourcing a configurable DC voltage to drive a variable speed electric load through an electrically powered accessory control circuit.

In one embodiment, a transport climate control system for use in a transport vehicle is disclosed. The system includes an electric load, a controller configured to determine a load of the electric load, and a battery pack voltage configurator circuit. The battery pack voltage configurator circuit includes a first battery bank providing a first voltage and a first current, a second battery bank providing a second voltage and a second current, and a plurality of switches. The controller is configured to control the plurality of switches based on the determined load of the electric load. The battery pack voltage configurator circuit is configured to provide an output voltage and an output current to drive the electric load, and the output voltage and the output current vary in magnitude based on the control of the plurality of switches.

In one embodiment, a method for configuring battery pack voltage steps for a transport vehicle having a climate control system is disclosed. The system has an electric load, a controller. and a battery pack voltage configurator circuit. The battery pack voltage configurator circuit has a first battery bank providing a first voltage and a first current, a second battery bank providing a second voltage and a second current, and a plurality of switches. The method includes determining a load of the electric load. The method also includes controlling the plurality of switches based on the determined load of the electric load. The method further includes the battery pack voltage configurator circuit providing an output voltage and an output current to drive the electric load. The output voltage and the output current vary in magnitude based on the control of the plurality of switches.

In one embodiment, a transport climate control system for use in a transport vehicle is disclosed. The system includes a controller configured to determine a charging profile based on a configuration of an electric supply equipment (ESE) and a battery pack voltage configurator circuit. The battery pack voltage configurator circuit includes a first battery bank, a second battery bank, and a plurality of switches. The controller is configured to control the plurality of switches based on the determined charging profile. The ESE is configured to charge the battery pack voltage configurator circuit.

In one embodiment, a transport climate control system for use in a transport vehicle is disclosed. The system includes a controller configured to determine an electrical supply voltage of an electric supply equipment (ESE) and a battery pack voltage configurator circuit. The battery pack voltage configurator circuit includes a first battery bank, a second battery bank, and a plurality of switches. The controller is configured to control the plurality of switches based on the determined electrical supply voltage of the ESE. The battery pack voltage configurator circuit is configured to provide a pack voltage (a voltage provided by the battery pack voltage configurator circuit as an input voltage to charge the battery bank) and a pack current (a current provided by the battery pack voltage configurator circuit as an input current to charge the battery bank) to charge the first battery bank and/or the second battery bank, the pack voltage and the pack current vary in magnitude based on the control of the plurality of switches.

In one embodiment, an electrically powered accessory is disclosed. The electrically powered accessory includes an electric load, a controller configured to determine a load of the electric load, and a battery pack voltage configurator circuit. The battery pack voltage configurator circuit includes a first battery bank providing a first voltage and a first current, a second battery bank providing a second voltage and a second current, and a plurality of switches. The controller is configured to control the plurality of switches based on the determined load of the electric load. The battery pack voltage configurator circuit is configured to provide an output voltage and an output current to drive the electric load, and the output voltage and the output current vary in magnitude based on the control of the plurality of switches.

In one embodiment, a method for configuring battery pack voltage steps for an electrically powered accessory is disclosed. The electrically powered accessory has an electric load, a controller, and a battery pack voltage configurator circuit. The battery pack voltage configurator circuit has a first battery bank providing a first voltage and a first current, a second battery bank providing a second voltage and a second current, and a plurality of switches. The method includes determining a load of the electric load. The method also includes controlling the plurality of switches based on the determined load of the electric load. The method further includes the battery pack voltage configurator circuit providing an output voltage and an output current to drive the electric load. The output voltage and the output current vary in magnitude based on the control of the plurality of switches.

In one embodiment, an electrically powered accessory is disclosed. The electrically powered accessory includes a controller configured to determine a charging profile based on a configuration of an electric supply equipment (ESE) and a battery pack voltage configurator circuit. The battery pack voltage configurator circuit includes a first battery bank, a second battery bank, and a plurality of switches. The controller is configured to control the plurality of switches based on the determined charging profile. The ESE is configured to charge the battery pack voltage configurator circuit.

In one embodiment, an electrically powered accessory is disclosed. The electrically powered accessory includes a controller configured to determine an electrical supply voltage of an electric supply equipment (ESE) and a battery pack voltage configurator circuit. The battery pack voltage configurator circuit includes a first battery bank, a second battery bank, and a plurality of switches. The controller is configured to control the plurality of switches based on the determined electrical supply voltage of the ESE. The battery pack voltage configurator circuit is configured to provide a pack voltage and a pack current to charge the first battery bank and/or the second battery bank, and the pack voltage and the pack current vary in magnitude based on the control of the plurality of switches.

It will be appreciated that the variable speed electric load (or loads) can be e.g., variable speed electric motors driving fans, blowers, and/or compressors, etc. It will also be appreciated that a load of the variable speed electric load can be an operation condition/mode of the variable speed electric load. For example, the controller can obtain data from sensor(s) to determine an operation condition/mode of the variable speed electric load. Based on the operation condition/mode, the controller can be configured to control the plurality of switches, and the battery pack voltage configurator circuit can be configured to provide output voltage/ current accordingly. It will further be appreciated that the output current can be an output maximum current, since the load condition/mode can be used (e.g., by the controller) to determine the current drained from the power source, and the battery pack voltage configurator circuit can provide a maximum current limit, based on the battery modules association (series, parallel, or combination, etc.).

One of the advantages of the climate control system with a battery pack voltage steps configurator is to optimize the electrical efficiency by configuring the battery pack to provide variable voltages (or variable voltage steps) to a direct current (DC) link (of e.g., an inverter, which can provide a variable speed control) to drive a variable speed electric load. Based on optimum operation points of the variable speed electric load, the battery pack voltage steps configurator can be designed to generate optimum voltages for the optimum operation points.

Another advantage of the climate control system with a battery pack voltage steps configurator is to optimize the efficiency for the variable speed electric load at partial load, which can make up a significant portion of the overall runtime of the variable speed electric load. A transport climate control system typically operates most of the time in a partial load. The transport climate control system typically maintains and/or changes (e.g., in pull down or loading/ unloading, the temperature have to be changed to get closer to setpoint) the load temperature in full load, to perform a pull down during climate controlled space conditioning, loading or unloading the cargo, etc. The voltage provided by the battery pack can be designed for a highest load and highest voltage operation of the variable speed electric load. At a lower load and lower voltage operation of the variable speed electric load, such design would have extra design margin that would lead to an increased life time of the components, and an increased runtime (e.g., continuous operation duration with the same charge).

Yet another advantage of the climate control system with a battery pack voltage steps configurator is to achieve optimum performance and/or maximum efficiency of using the energy source, for example, a battery pack to ultimately drive the variable speed electric load in an Auxiliary Power Unit (APU) application for a vehicle HVAC system. Another advantage of the climate control system with a battery pack voltage steps configurator is to achieve optimum and/or maximum system efficiency to meet emissions laws.

BRIEF DESCRIPTION OF THE DRAWINGS

References are made to the accompanying drawings that form a part of this disclosure and which illustrate embodiments in which the systems and methods described in this specification can be practiced.

FIG. 1B illustrates a side view of a truck with a transport climate control system, according to one embodiment.

FIG. 7 is a flow chart illustrating a method for configuring battery pack voltage steps for a transport vehicle having a climate control system, according to a second embodiment.

Like reference numbers represent like parts throughout.

DETAILED DESCRIPTIONS

Figure 1A:
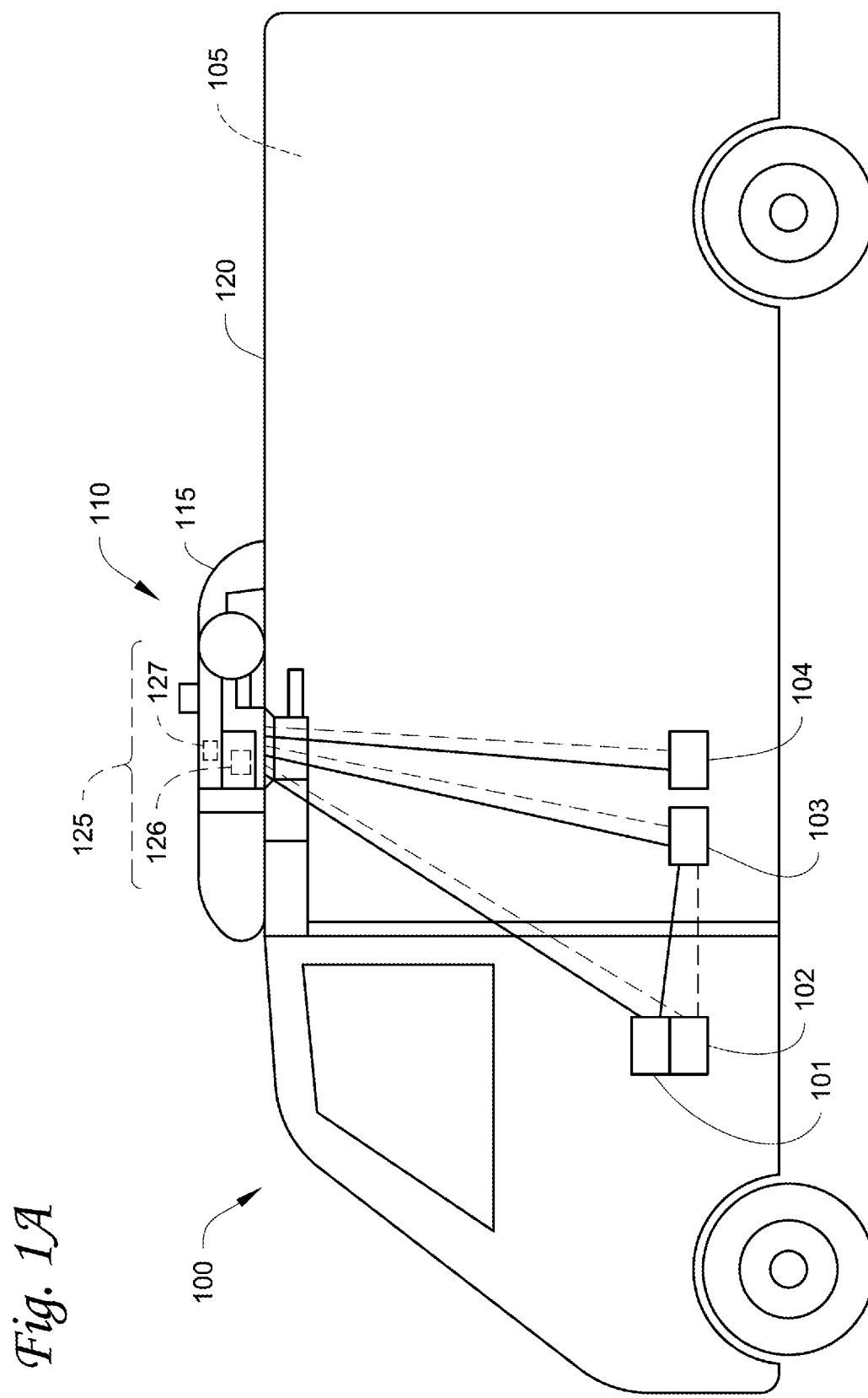
FIG. 1A illustrates a side view of a van with a transport climate control system, according to one embodiment.

This disclosure relates generally to an electrically powered accessory configured to be used with at least one of a vehicle, trailer, and a transport container. More specifically, the disclosure relates to systems and methods for managing power and efficiently sourcing a configurable DC voltage to drive a variable speed electric load through an electrically powered accessory control circuit. It will be appreciated that the variable speed electric load includes a load having at least two speeds.

A climate control system may be generally configured to control one or more environmental conditions (e.g., temperature, humidity, atmosphere, air quality, etc.) in an internal space (e.g., passenger compartment, cargo space, etc.) of a transport vehicle (e.g., a passenger bus, a passenger railcar, a truck, a container (such as a container on a flat car, an intermodal container, etc.), a box car, a semi-tractor, etc.). Generally, the internal space of a transport vehicle can be supplied with fresh air (e.g., outside air) and/or conditioned air (e.g., air conditioned by a refrigeration circuit of the climate control system) by the climate control system.

The embodiments disclosed herein can improve the efficiency of the battery, make the energy capacity more effective to the operational requirements of the system, and reduce the cost. It will be appreciated that optimizing efficiency on battery can provide effective cost reduction. Energy storage (such as battery) capacity can be critical in transport climate control system(s), since the battery weight can be proportional to the battery capacity and the cost of selected chemistry. Higher battery efficiency typically means less capacity requirement, which can drive direct battery cost reduction and indirect weight reduction.

It is noted that: U.S. application Ser. No. 16/565,110, "TRANSPORT CLIMATE CONTROL SYSTEM WITH A SELF-CONFIGURING MATRIX POWER CONVERTER,"; U.S. application Ser. No. 16/565,146, "OPTIMIZED POWER MANAGEMENT FOR A TRANSPORT CLIMATE CONTROL ENERGY SOURCE,"; U.S. Provisional Application No. 62/897,833, "OPTIMIZED POWER DISTRIBUTION TO TRANSPORT CLIMATE CONTROL SYSTEMS AMONGST ONE OR MORE ELECTRIC SUPPLY EQUIPMENT STATIONS,"; European Patent Application Number 19382776.3, "PRIORITIZED POWER DELIVERY FOR FACILITATING TRANSPORT CLIMATE CONTROL,"; U.S. application Ser. No. 16/565,205, "TRANSPORT CLIMATE CONTROL SYSTEM WITH AN ACCESSORY POWER DISTRIBUTION UNIT FOR MANAGING TRANSPORT CLIMATE CONTROL ELECTRICALLY POWERED ACCESSORY LOADS,"; U.S. application Ser. No. 16/565,235, "AN INTERFACE SYSTEM FOR CONNECTING A VEHICLE AND A TRANSPORT CLIMATE CONTROL SYSTEM,"; U.S. application Ser. No. 16/565,252, "DEMAND-SIDE POWER DISTRIBUTION MANAGEMENT FOR A PLURALITY OF TRANSPORT CLIMATE CONTROL SYSTEMS,"; and U.S. application Ser. No. 16/565,282, "OPTIMIZED POWER CORD FOR TRANSFERRING POWER TO A TRANSPORT CLIMATE CONTROL SYSTEM,"; all filed concurrently herewith on Sep. 9, 2019, and the contents of which are incorporated herein by reference.

While the embodiments described below illustrate different embodiments of a transport climate control system, it will be appreciated that the electrically powered accessory is not limited to the transport climate control system or a climate control unit (CCU) of the transport climate control system. It will be appreciated that a CCU can be e.g., a transport refrigeration unit (TRU). In other embodiments, the electrically powered accessory can be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked and/or idling and/or charging. The electrically powered accessory can require substantial power to operate and/or continuous and/or autonomous operation (e.g., controlling temperature/humidity/airflow of a climate controlled space) on an as needed basis, independent of the vehicle's operational mode.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (not shown) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller unit 115 may comprise a single integrated control unit 126 or may comprise a distributed network of climate controller elements 126, 127. The number of distributed control elements in a given network can depend upon the particular application of the principles described herein.

The climate-controlled van 100 can also include a vehicle PDU 101, a VES 102, a standard charging port 103, and/or an enhanced charging port 104. The VES 102 can include a controller (not shown). The vehicle PDU 101 can include a controller (not shown). In one embodiment, the vehicle PDU controller can be a part of the VES controller or vice versa. In one embodiment, power can be distributed from e.g., an electric vehicle supply equipment (EVSE, not shown), via the standard charging port 103, to the vehicle PDU 101. Power can also be distributed from the vehicle PDU 101 to an electrical supply equipment (ESE, not shown) and/or to the CCU 115 (see solid lines for power lines and dotted lines for communication lines). In another embodiment, power can be distributed from e.g., an EVSE (not shown), via the enhanced charging port 104, to an ESE (not shown) and/or to the CCU 115. The ESE can then distribute power to the vehicle PDU 101 via the standard charging port 103.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (not shown) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

It will be appreciated that similar to the climate-controlled van 100 shown in FIG. 1A, the climate-controlled straight truck 130 of FIG. 1B can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

Figure 1C:
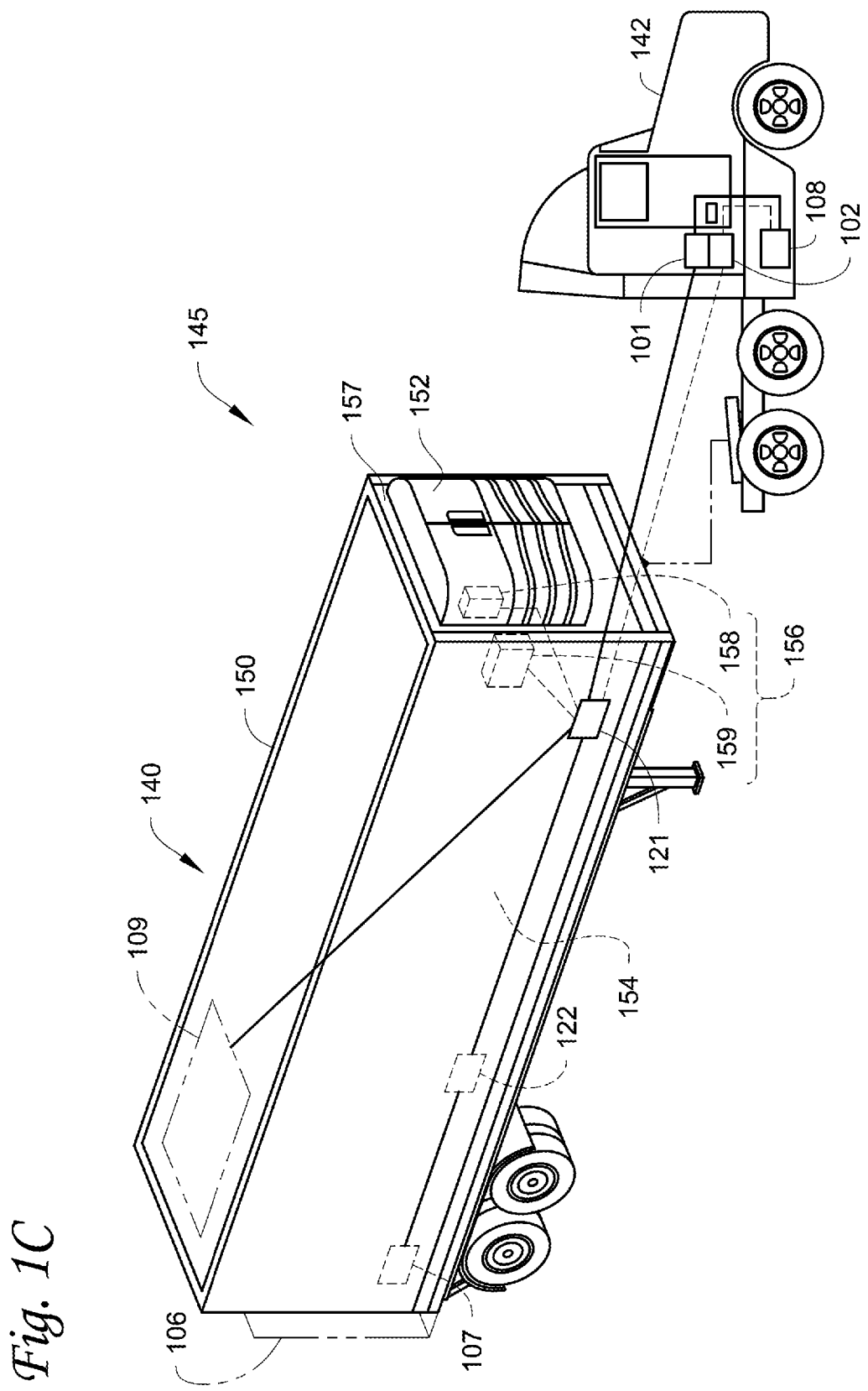
FIG. 1C illustrates a perspective view of a climate controlled transport unit, with a transport climate control system, attached to a tractor, according to one embodiment.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (not shown) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

In some embodiments, the tractor 142 can include an optional APU 108. The optional APU 108 can be an electric auxiliary power unit (eAPU). Also, in some embodiments, the tractor 142 can also include a vehicle PDU 101 and a VES 102 (not shown). The APU 108 can provide power to the vehicle PDU 101 for distribution. It will be appreciated that for the connections, solid lines represent power lines and dotted lines represent communication lines.

The climate controlled transport unit 140 can include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate controlled transport unit 140. The PDU 121 can include a PDU controller (not shown). The PDU controller can be a part of the climate controller 156.

The PDU 121 can distribute power from the power sources of the climate controlled transport unit 140 to e.g., the transport climate control system 145. The climate controlled transport unit 140 can also include an optional liftgate 106. The optional liftgate battery 107 can provide power to open and/or close the liftgate 106.

It will be appreciated that similar to the climate-controlled van 100, the climate controlled transport unit 140 attached to the tractor 142 of FIG. 1C can also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152. It will be appreciated that the charging port(s) 103 and/or can be on either the tractor 142 or the trailer. For example, in one embodiment, the standard charging port 103 is on the tractor 142 and the enhanced charging port 104 is on the trailer.

Figure 1D:
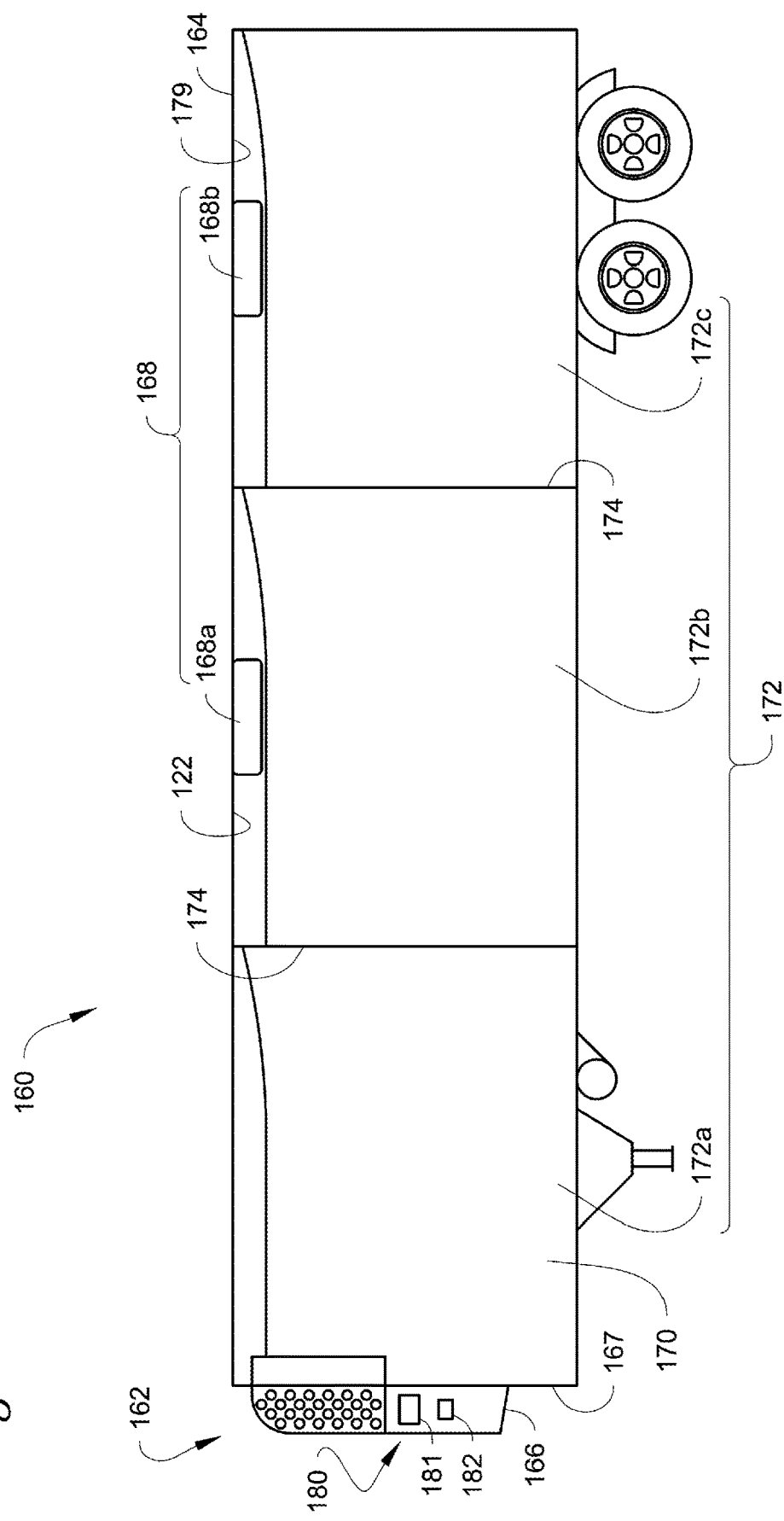
FIG. 1D illustrates a side view of a climate controlled transport unit with a multi-zone transport climate control system, according to one embodiment.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (not shown) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

It will be appreciated that similar to the climate-controlled van 100, the climate controlled transport unit 160 of FIG. 1D can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
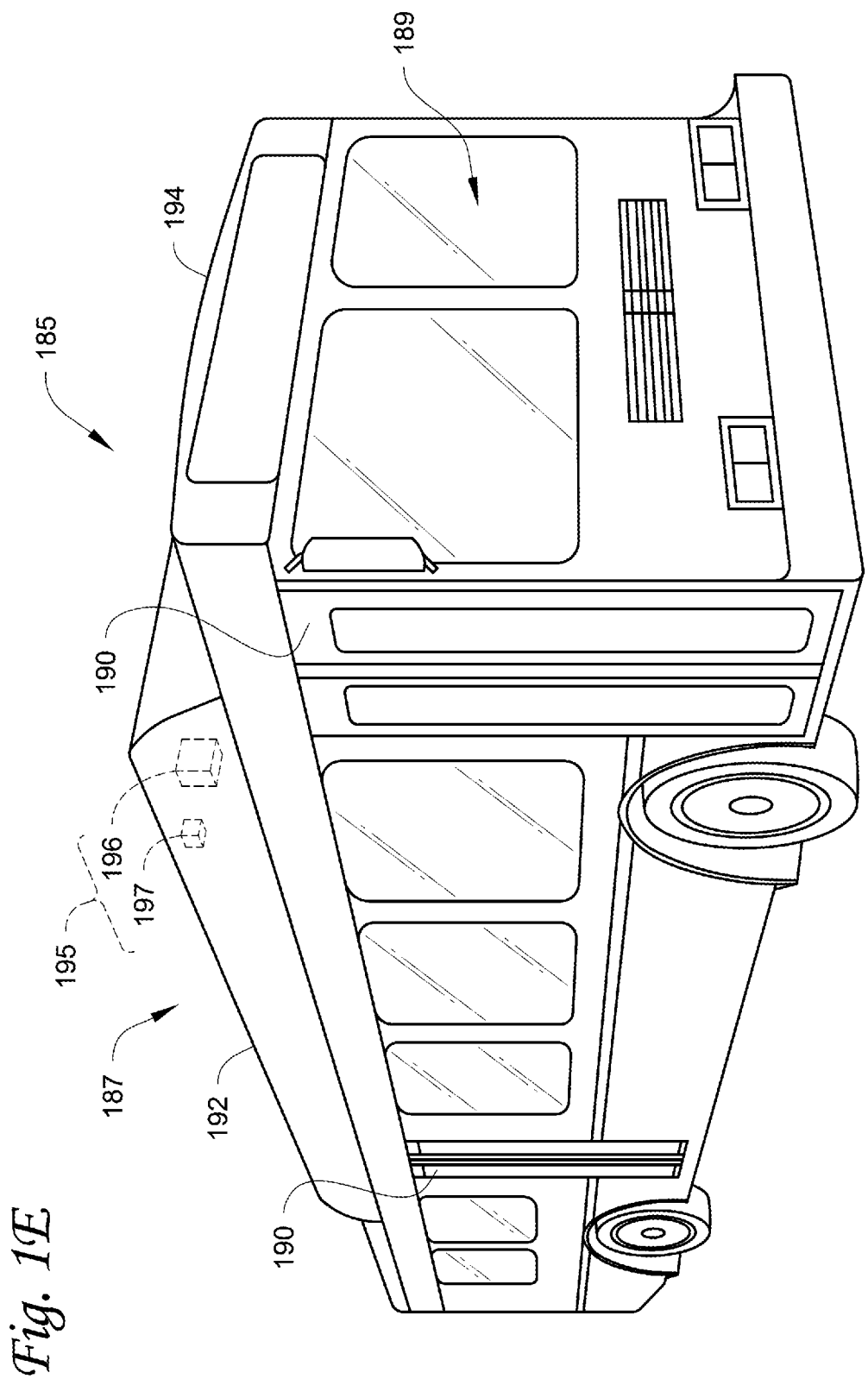
FIG. 1E illustrates a perspective view of a mass-transit vehicle including a transport climate control system, according to one embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

It will be appreciated that similar to the climate-controlled van 100, the vehicle 185 including a transport climate control system 187 of FIG. 1E can also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

Figure 2:
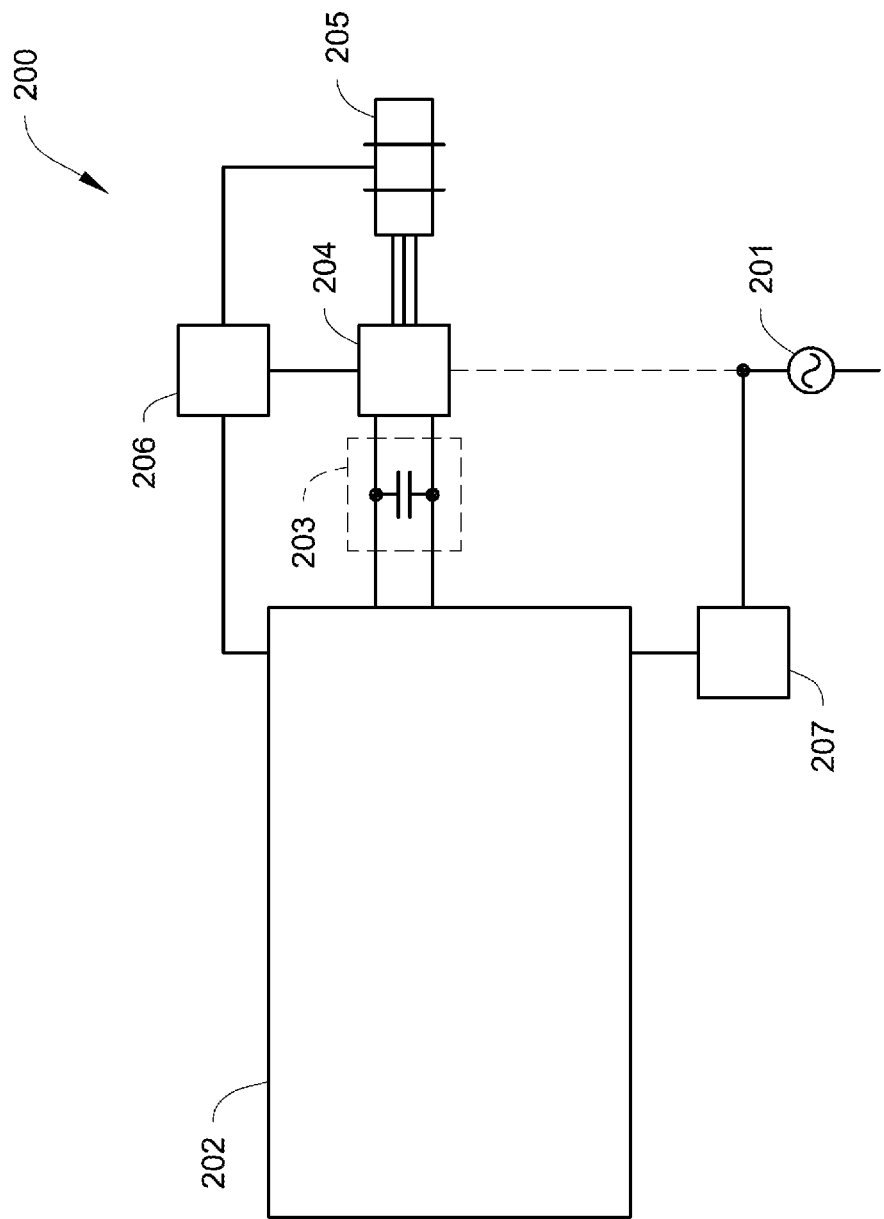
FIG. 2 illustrates a schematic view of a transport climate control circuit, according to one embodiment.

FIG. 2 illustrates a schematic of a transport climate control circuit 200 for a climate control system, according to one embodiment. The transport climate control circuit 200 can be used, for example, with the climate control units 115, 133, 152, 166, and 192 shown in FIGS. 1A-1E. The transport climate control circuit 200 can be controlled by a controller (e.g., the climate controllers 125, 135, 156, 180, 195 shown in FIGS. 1A-1E).

The transport climate control circuit 200 includes a battery pack voltage steps configurator 202, an inverter circuit 204, a variable speed electric load 205, and a controller 206. The transport climate control circuit 200 can also include a charger 207. It will be appreciated that in some embodiments, the inverter circuit 204 can also work as a charger, and that the charger 207 is not needed. The transport climate control circuit 200 can further include a DC link capacitor 203. It will be appreciated that in some embodiments, the DC link capacitor 203 can be optional and is not needed (or the number and/or capacitance of the capacitor can be significantly reduced). It will be appreciated that embodiments disclosed herein can improve reliability on the inverter circuit 204 due to a reduction on the capacitance associated with a DC Link provided between the battery pack voltage steps configurator 202 and the inverter circuit 204. A direct connection between DC Link and a battery pack (not shown) of the battery pack voltage steps configurator 202 can reduce the capacitance required to maintain the voltage stable under load.

The battery pack voltage steps configurator 202 is configured to provide an output voltage and an output current to drive the variable speed electric load. The battery pack voltage steps configurator 202 can optimize the electrical efficiency by configuring the battery pack to provide variable voltages (or variable voltage steps) to the DC link to drive the variable speed electric load. The inverter circuit 204 is configured to convert the voltage outputted by the battery pack voltage steps configurator 202 to an AC voltage to drive the variable speed electric load 205. The variable speed electric load 205 is configured to be driven by the AC voltage from the inverter circuit 204. The controller 206 is configured to control the battery pack voltage steps configurator 202 to generate a variable voltage based on the voltage (or load) demanded by the variable speed electric load 205. The DC link capacitor 203 is configured to stabilize voltage obtained from the battery pack voltage steps configurator 202 while the voltage is being converted back to AC power via the inverter circuit 204. The charger 207 is configured to charge the battery pack of the battery pack voltage steps configurator 202.

The transport climate control circuit 200 is connected to a power source 201. In one embodiment, the power source 201 can be an alternating current (AC) power shore power, an AC utility power, etc. The power source 201 can provide, for example, 120 volts, 220 volts, or 240 volts input to charge the transport climate control circuit 200. In FIG. 2, the power source 201 is connected to the charger 207. In other embodiments (e.g., when the inverter circuit 204 also works as a charger and the charger 207 is not needed), the power source 201 can connect to the inverter circuit 204. It will be appreciated that similar to the inverter circuit 204, the vehicle On-Board Charger (OBC), the accessory OBC, and/or the alternating current power module (ACPM) AC/DC converter can be used as a charger to connect to the power source 201, and the charger 207 is not needed. In one embodiment, the power source 201 and/or the charger 207 can be an Electric Supply Equipment (ESE). The ESE can be an EVSE, an EV charging station, a vehicle charger system, an electric power source, etc. In another embodiment, the power source 201 and/or the inverter circuit 204 can be part of an ESE. In one embodiment, the ESE can operate as a DC and/or AC power source.

In one embodiment, the charger 207 connects to the battery pack voltage steps configurator 202 so that the power source 201 can charge the battery pack of the battery pack voltage steps configurator 202, via the charger 207. In another embodiment, the inverter circuit 204 connects to the battery pack voltage steps configurator 202 so that the power source 201 can charge the battery pack of the battery pack voltage steps configurator 202, via the inverter circuit 204.

The battery pack voltage steps configurator 202 can provide (or source) a variable output voltage to the DC link of the inverter circuit 204 (e.g., via the DC link capacitor 203, or by directly feeding into the inverter circuit 204 without a DC link capacitor). It will be appreciated that the DC link can be defined as a connection from a DC source feeding into the inverter circuit 204. The variable output voltage can be, for example, 400 volts DC (or 374 volts, 384 volts DC, 421 volts DC, 432 volts DC, etc.) or 800 volts DC (or 749 volts, 768 volts DC, 842 volts DC, 864 volts DC, etc.). It will be appreciated that in other embodiments, the variable output voltage can be any suitable voltage as required for the desired application. It will also be appreciated that the above variable output voltage (400 VDC, 800 VDC, etc.) can be nominal voltage, and the effective output voltage can depend on e.g., battery state of charge and/or connected load, etc.

The DC link capacitor 203 stabilizes voltage obtained from the battery pack voltage steps configurator 202 while the voltage is being converted back to AC power via the inverter circuit 204. In some embodiments, for a one kilowatt operation, the DC link capacitor can be in a range of at or about 0.1 millifarad to at or about 2 millifarad for a voltage from at or about 400 volts to at or about 800 volts. It will be appreciated that the capacitance of the DC link capacitor 203 can be designed to be compatible to both voltages (e.g., 400 volts and 800 volts) when e.g., the battery pack is reconfigurable.

The inverter circuit 204 converts the voltage outputted by the battery pack voltage steps configurator 202 to an AC voltage to drive the variable speed electric load 205. In some embodiments, the inverter circuit 204 (sometimes called an inverter bridge) can include switches (not shown). The switches can be controlled on and/or off to generate a variable power (for example, variable frequency, variable current, variable voltage, etc.) from an input DC voltage (i.e. the voltage outputted by the battery pack voltage steps configurator 202) to drive the variable speed electric load 205. Matching the AC voltage and the voltage demanded by the variable speed electric load 205 can be an efficient way to utilize the energy from the battery pack voltage steps configurator 202, and converting a full voltage to a corresponding AC voltage can be an efficient conversion for the inverter circuit 204. For example, when converting a full voltage to a corresponding AC voltage, no extra boost or buck circuit is needed for the voltage difference between the voltage to be inverted and the inverted AC voltage. As such, when the AC voltage matches the voltage demanded by the variable speed electric load 205, the energy from the battery pack voltage steps configurator 202 can be efficiently utilized to drive the variable speed electric load 205.

The embodiments described herein can provide a lower voltage from the battery pack voltage steps configurator 202 when the voltage demanded by the variable speed electric load 205 is low, and provide a higher voltage from the battery pack voltage steps configurator 202 when the voltage demanded by the variable speed electric load 205 is high. For example, in one embodiment, the variable speed electric load 205 can be a three-phase AC compressor that requires about 800 volts (e.g., 749 volts, 768 volts DC, 842 volts DC, 864 volts DC, etc.) at high speed/power/voltage and requires about 400 volts (e.g., 374 volts, 384 volts DC, 421 volts DC, 432 volts DC, etc.) at low speed/power/voltage. The embodiments described herein can have a controller 206 to control the battery pack voltage steps configurator 202 to generate a variable voltage based on the voltage (or load) demanded by the variable speed electric load 205.

The variable speed electric load 205 is driven by the AC voltage from the inverter circuit 204. In some embodiments, the variable speed electric load 205 can be, e.g., motor(s) driving (or connected to) loads such as fans, blowers, and/or compressors, etc. In some embodiments, the motor(s) can be multiple (variable) speed motor(s). In some embodiments, the compressor can be a two-speed compressor for a HVAC system that includes a high speed/power for providing rapid cooling or heating to a space and a low speed/power for maintaining a desired temperature in the space. In one embodiment, the two-speed compressor can be a three-phase AC motor connected to a compressor that requires about 800 volts (e.g., 749 volts, 768 volts DC, 842 volts DC, 864 volts DC, etc.) at high speed/power and requires about 400 volts (e.g., 374 volts, 384 volts DC, 421 volts DC, 432 volts DC, etc.) at low speed/power. In general, a higher load on the variable speed electric load 205 can require a higher speed and/or a higher voltage to drive the variable speed electric load 205 and a lower load on the variable speed electric load 205 can require a lower speed and/or a lower voltage to drive the variable speed electric load 205.

The controller 206 controls the battery pack voltage steps configurator 202 based on the voltage (or load) demanded by the variable speed electric load 205. In one embodiment, the controller 206 can receive data from a plurality of sensors (not shown). The plurality of sensors can monitor a plurality of parameters such as, for example, a mechanic torque requirement of the variable speed electric load 205 (for example, a load on the variable speed electric load 205), an optimum power requirement (for example, voltage, current, and/or frequency) of the variable speed electric load 205, a calculated (or rated) speed of the variable speed electric load 205, an output AC voltage of the inverter circuit 204, an output current of the inverter circuit 204, an output frequency of the inverter circuit 204, etc. The controller 206 can control the battery pack voltage steps configurator 202 based on any or all of the sensed parameters. The detailed description of controlling the battery pack voltage steps configurator 202 using the controller 206 can be found in the description of FIG. 3.

It will be appreciate that the transport climate control circuit 200 can connect to a refrigeration circuit, for example, a compressor, a condenser, an evaporator, and an expansion valve to provide conditioned air within the climate controlled space.

In one embodiment, the variable speed electric load 205 can be a hermetic compressor for an APU in an HVAC system for a vehicle, for example, a semi-truck. The compressor can run at a multiple speeds based on the load on the compressor. The APU can be operated when a main prime mover of the vehicle is turned off such as, for example, when a driver parks the vehicle for an extended period of time to rest. The APU can provide, for example, power to operate a secondary HVAC unit to provide conditioned air to a cabin of the vehicle. The APU can also provide power to operate cabin accessories within the cabin such as a television, a microwave, a coffee maker, a refrigerator, etc. The compressor can run at a high speed (that requires a higher input voltage, e.g., about 800 volts) to operate the secondary HVAC system at a high capacity provide rapid temperature control (e.g., cooling) to the cabin. The compressor can run at a low speed (that requires a lower input voltage, e.g., about 400 volts) to operate the secondary HVAC system at a low capacity to maintain a temperature within the cabin. In some embodiments, the low speed mode can be the predominant operation mode of the compressor. It will be appreciated that generally the APU can operate more efficiently (e.g., require less energy) when the compressor is running at low speed regardless of whether the APU is a mechanically driven APU (e.g., prime mover driven) or an electrically driven APU (e.g., battery driven). For a mechanically driven APU, the prime mover can require less fuel (e.g., be more fuel efficient) when the compressor is operating at low speed versus operating at high speed. For an electrically driven APU, less energy from the battery may be required when the compressor is operating at low speed versus operating at high speed. It will be appreciated that generally operating at lower speed can result in more run time. Also, regardless of whether the APU is mechanically or electrically driven, the APU can have a limited run time based on the amount of fuel stored or based on battery capacity and/or state of charge. Accordingly, the embodiments described herein can improve the efficiency and reduce the energy loss of the compressor and extend the battery longevity.

Figure 3:
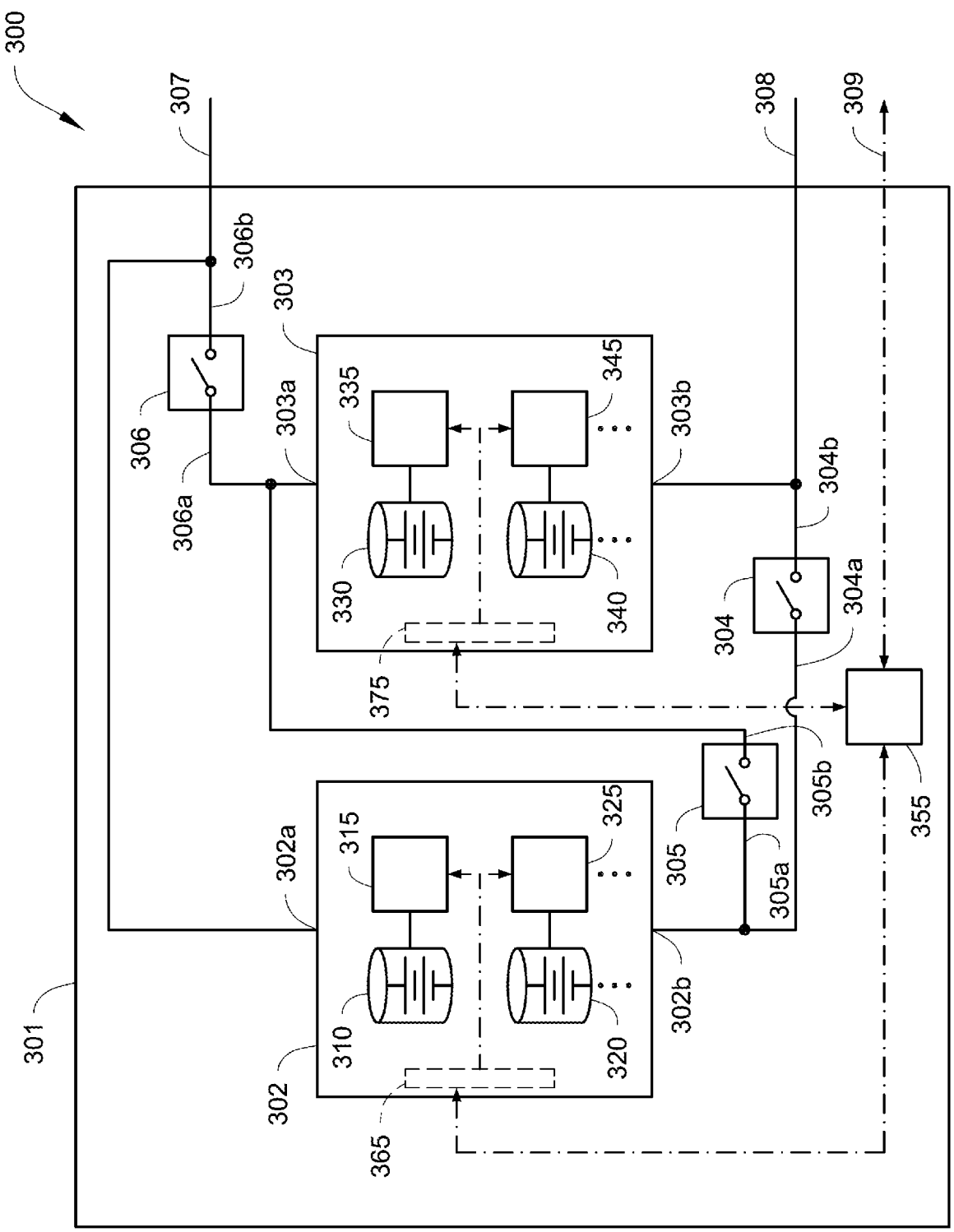
FIG. 3 illustrates a circuit diagram of a battery pack voltage steps configurator for a climate control system, according to a first embodiment.

FIG. 3 is a circuit diagram of a battery pack voltage steps configurator 300 for a climate control system, according to a first embodiment. The battery pack voltage steps configurator 300 can be, for example, the battery pack voltage steps configurator 202 in FIG. 2.

The battery pack voltage steps configurator 300 includes a battery pack 301. It will be appreciated that in a climate control system, battery cells can be building blocks of a battery module. Typically a battery cell can have a voltage of 3.7 volts (or 4 volts or any other suitable voltage). About twelve (12) battery cells can be connected in series to make up a string of battery cells. The voltage of the string of battery cells can be, for example, 44.4 volts (or 48 volts, or any other suitable voltage). A battery module is defined as one or more (e.g., three) strings of battery cells connected in parallel. The number of strings of battery cells depends on the current capacity of the battery module is to provide. Typically a battery module can have a voltage of 48 volts (or 44.4 volts or any other suitable voltage). It will be appreciated that under some regulations, 48 volts can be a level of battery voltage that an electrician can handle without a special license.

About eight (or nine or any other suitable number) battery modules can be connected in series to make up a string of battery modules. The voltage of the string of battery modules can be, for example, 400 volts (or any other suitable voltage). A battery bank is defined as one or more strings of battery modules connected in parallel. The number of strings of battery modules depends on the current capacity of the battery bank is to provide. Typically a battery bank can have a voltage of 400 volts (or any other suitable voltage). One or more battery banks can connect in series and make up a string of battery banks. A battery pack is defined as one or more strings of battery banks connected in parallel. It will be appreciated that reference voltage in the transport climate control system industry can be 230 VAC/460 VAC which corresponds to the 400 VDC/800 VDC configuration disclosed herein.

As shown in FIG. 3, the battery pack 301 includes two battery banks 302 and 303. The battery bank 302 includes a string of battery modules (310, 320, etc.) connected in series. The battery bank 302 also includes battery management systems (315, 325, etc.). In one embodiment, each battery bank 302, 303 can be configured to have the same/even voltage and/or current.

The battery management system 315 measures the status/parameters (e.g., state of charge (such as fully charged, partially charged/discharged, fully discharged, etc.), voltage, current, temperature, etc.) of each battery cell of the battery module 310 and can manage and/or balance the status/parameters (e.g., to equalize the system) of the battery cells of the battery module 310. For example, battery management system 315 can balance the state of charge of the battery cells (so that the battery cells can be charged or discharged evenly) of the battery module 310. Balancing charging or discharging of the battery cells can maximize energy storage capacity of the battery cells. If charging/discharging of the battery cells is not balanced, energy storage capacity of the battery cells and the battery life of the battery cells can be lost. The loss can be further exacerbated when one battery cell becomes weaker than the others and dominates the charge/discharge cycle. It will also be appreciated that in order to balance charging or discharging of the battery cells, there can be switches (not shown) so that the battery management system 315 can switch in or out particular battery cell(s) of the battery module 310 for charging or discharging. A battery management system at the battery module level can typically manage the battery cells for adequate charging and discharging, depending on the battery cells' temperature and state of charge.

Similarly, the battery management system 325 measures the status/parameters of each battery cell of the battery module 320 and can balance the status/parameters of the battery cells of the battery module 320.

Similar to the battery bank 302, the battery bank 303 includes a string of battery modules (330, 340, etc.) connected in series. The battery bank 303 also includes battery management systems (335, 345, etc.). The battery management system 335 measures the status/parameters of each battery cell of the battery module 330 and can balance the status/parameters of the battery cells of the battery module 330. The battery management system 345 measures the status/parameters of each battery cell of the battery module 340 and can balance the status/parameters of the battery cells of the battery module 340. It will be appreciated that each battery management system (315, 325, 335, 345, etc.) corresponds to a battery module (310, 320, 330, 340, etc.), respectively. The battery management systems (315, 325, 335, 345, etc.) are at the battery module level.

It will be appreciated that the battery bank 302 can include eight (or nine) battery modules (e.g., each having a voltage of 48 volts) connected in series. When charged, the battery bank 302 can have a voltage of about 400 volts. The battery bank 303 can include eight (or nine) battery modules (e.g., each having a voltage of 48 volts) connected in series. When charged, the battery bank 303 can have a voltage of about 400 volts.

In one embodiment, the battery bank 302 can include a battery management system 365. The battery management system 365 connects to, communicates with, and controls the battery management systems (315, 325, etc.) within the battery bank 302 via communication lines. The battery management system 365 measures the status/parameters (e.g., state of charge, voltage, current, temperature, etc.) of each battery module of the battery bank 302 and can balance the status/parameters of the battery modules of the battery bank 302.

The battery bank 303 can include a battery management system 375. The battery management system 375 connects to, communicates with, and controls the battery management systems (335, 345, etc.) within the battery bank 303 via communication lines. The battery management system 375 measures the status/parameters (e.g., state of charge, voltage, current, temperature, etc.) of each battery module of the battery bank 303 and can balance the status/parameters of the battery modules of the battery bank 303.

It will be appreciated that in order to balance the charging or discharging of the battery modules (e.g., to equalize the system), there can be switches (not shown) so that the battery management system 365 can switch in or out particular battery module(s) of the battery bank 302 for charging or discharging. It will also be appreciated that in order to balance charging or discharging of the battery modules, there can be switches (not shown) so that the battery management system 375 can switch in or out of particular battery module(s) of the battery bank 303 for charging or discharging. It will be appreciated that the battery management systems (365, 375, etc.) at the battery bank level can be optional.

In one embodiment, the battery pack 301 includes a battery management system 355. When there are battery management systems (365, 375, etc.) at the battery bank level, the battery management system 355 connects to, communicates with, and controls the battery bank level battery management systems (365, 375, etc.) within the battery pack 301 via communication lines. When there are no battery management systems (365, 375, etc.) at the battery bank level, the battery management system 355 connects to, communicates with, and controls the battery module level battery management systems (315, 325, 335, 345, etc.) within the battery pack 301 via communication lines. The battery management system 355 measures the status/parameters (e.g., state of charge, voltage, current, temperature, etc.) of each battery bank of the battery pack 301 and can balance the status/parameters of the battery banks of the battery pack 301. It will be appreciated that in order to balance charge or discharge of the battery banks, there can be switches (304, 305, 306, etc.) so that the battery management system 355 can switch in or out of particular battery bank(s) of the battery pack 301 for charging or discharging.

It will be appreciated that the battery management systems (315, 325, 335, 345, 355, 365, 375, etc.) can be controllers having processors. In one embodiment, the battery management systems (315, 325, 335, 345, 355, 365, 375, etc.) can be integrated circuit chips. It will also be appreciated that the battery pack 301 can include a cooling system (e.g., a liquid cooling system) to cool down the battery pack/bank(s)/module(s)/cell(s).

In one embodiment, the battery pack includes switches (304, 305, 306, etc.). The switches (304, 305, 306, etc.) can be one or more of a Metal-Oxide-Semiconductor Field-Effect Transistor (MOSFET), a N-type metal-oxide-semiconductor (NMOS) switch, an Insulated Gate Bipolar Transistor (IGBT), a Bipolar Junction Transistor (BJT), a solid state switch, a relay, a contactor, or the like. The battery management system 355 can control each of the switches (304, 305, 306, etc.) to an open state and a close state to configure the voltage/current of the battery pack 301.

The battery pack 301 includes a voltage supply output 307 and a voltage reference output 308. The combination of the voltage supply output 307 and the voltage reference output 308 can connect to and provide an output voltage to, for example, a DC link of an inverter circuit (e.g. the inverter circuit 204 of FIG. 2), via a DC link capacitor (e.g., the DC link capacitor 203 of FIG. 2) or by directly feeding into the inverter circuit without a (or with a reduced) DC link capacitor. It will be appreciated that embodiments disclosed herein do not require a DC/DC converter and can reduce/minimize energy losses associated with the conversion. Typically DC/DC converters operate at about 95%-98% efficiency, eliminating the conversion can provide 2%-5% improvement on efficiency. Embodiments disclosed herein can allow reduction on the energy storage (such as battery) cost.

Each of the switches (304, 305, 306, etc.) has two ends. Each of the battery banks (302, 303) has a positive terminal (voltage supply output or the like) and a negative terminal (voltage reference output or ground or the like). The first end 304a of the switch 304 connects to the first end 305a of the switch 305 and the negative terminal 302b of the battery bank 302. The second end 304b of the switch 304 connects to the negative terminal 303b of the battery bank 303 and the voltage reference output 308. The second end 305b of the switch 305 connects to the first end 306a of the switch 306 and the positive terminal 303a of the battery bank 303. The second end 306b of the switch 306 connects to the positive terminal 302a of the battery bank 302 and the voltage supply output 307.

In one embodiment, a controller (not shown, such as the controller 206 of FIG. 2) connects with, communicates with, and controls the battery management system 355 at the battery pack level, via a communication line 309. It will be appreciated that the battery management systems (355, 365, 375, etc.) at both the battery pack level and the battery bank level can be optional. In such embodiment, the battery management systems (315, 325, 335, 345, etc.) at the battery module level coordinate with each other regarding balancing the charging/discharging of the battery cells. In such embodiment, the controller connects, communicates with, and controls the battery management systems (315, 325, 335, 345, etc.) at the battery module level and the switches (304, 305, 306, etc.). It will also be appreciated that the communication line(s) can be bidirectional. It will further be appreciated that the communication line(s) can be part of a controller area network (CAN) or any suitable communication network.

In one embodiment, the controller can determine operational parameters (e.g., speed/frequency, torque, load, etc.) of the variable speed electric load (such as the variable speed electric load 205 of FIG. 2), based on a plurality of parameters sensed by a plurality of sensors (now shown) and sent to the controller. The controller can control (or send message(s) to) the battery management system 355 based on the determined/sensed operational parameters. The battery management system 355 at the battery pack level can control the switches (304, 305, 306, etc.) based on, for example, the message/control from the controller. It will be appreciated that the battery management systems (315, 325, 335, 345, 355, 365, 375, etc.) can be located in and be part of the controller. In one embodiment, the controller can be in the inverter circuit.

In operation, based on the determined operational parameters, when a first output voltage and a first output current are demanded corresponding to a high speed and low torque/low load requirement (e.g., high voltage such as about 800 volts and low current are demanded, under e.g., a first/full load) of the variable speed electric load, the battery management system 355 can control the switches 304 and 306 to be opened, and the switch 305 to be closed. In such scenario, the battery bank 302 and the battery bank 303 are connected in series. For example, if the battery bank 302 has a voltage of about 400 volts, and the battery bank 303 has a voltage of about 400 volts, the output voltage when the battery bank 302 and the battery bank 303 are connected in series is about 800 volts. The output current is the current of the battery bank 302 or the current of the battery bank 303.

In operation, based on the determined operational parameters, when a second output voltage and a second output current are demanded corresponding to a low speed and high torque/high load requirement (e.g., low voltage such as about 400 volts and high current are demanded, under e.g., a second/partial load) of the variable speed electric load, the battery management system 355 can control the switches 304 and 306 to be closed, and the switch 305 to be opened. In such scenario, the battery bank 302 and the battery bank 303 are connected in parallel. For example, if the battery bank 302 has a voltage of about 400 volts, and the battery bank 303 has a voltage of about 400 volts, the output voltage when the battery bank 302 and the battery bank 303 are connected in parallel is about 400 volts. The output current is the combination (addition) of the current of the battery bank 302 and the current of the battery bank 303.

It will be appreciated that parallel connection of the battery banks 302, 303 may result in the battery pack balancing itself between battery banks. It will be appreciated that in some embodiments additional switches and/or balancing circuit with resistor/FET or charge shuttle capacitor may be needed to ensure that the battery banks 302, 303 are balanced.

In operation, based on the determined operational parameters, when a third output voltage and a third output current are demanded corresponding to low speed and low torque/low load requirement (e.g., low voltage such as about 400 volts and low current are demanded under e.g., a third load) of the variable speed electric load, the battery management system 355 can control the switches 305 and 306 to be opened, and the switch 304 to be closed. In such scenario, the battery bank 303 is disconnected (i.e. not used) from the circuit. For example, if the battery bank 302 has a voltage of about 400 volts, and the battery bank 303 has a voltage of about 400 volts, the output voltage when the battery bank 303 is disconnected is about 400 volts (i.e., the voltage of the battery bank 302). The output current is the current of the battery bank 302. In such scenario, the battery management system 355 controls the switches based on, for example, the operational status of the battery banks (302, 303), for example, when the battery bank 303 is not functioning, or is discharged more than the battery bank 302. For example, when the battery bank 302 and the battery bank 303 are connected in series, and when the controller determines that the battery bank 303 malfunctions, the controller can be configured to control the plurality of switches (e.g., the switches 305 and 306 to be opened, and the switch 304 to be closed) so that battery bank 303 is disconnected from the battery pack voltage configurator circuit.

In one embodiment, in operation, based on the determined operational parameters, when a third output voltage and a third output current are demanded corresponding to low speed and low torque/low load requirement (e.g., low voltage such as about 400 volts and low current are demanded under the third load) of the variable speed electric load, the battery management system 355 can control the switches 304 and 305 to be opened, and the switch 306 to be closed. In such scenario, the battery bank 302 is disconnected (i.e. not used) from the circuit. For example, if the battery bank 302 has a voltage of about 400 volts, and the battery bank 303 has a voltage of about 400 volts, the output voltage when the battery bank 302 is disconnected is about 400 volts (i.e., the voltage of the battery bank 303). The output current is the current of the battery bank 303. In such scenario, the battery management system 355 controls the switches based on, for example, the operational status of the battery banks (302, 303), for example, when the battery bank 302 is not functioning, or is discharged more than the battery bank 303. For example, when the battery bank 302 and the battery bank 303 are connected in series, and when the controller determines that the battery bank 302 malfunctions, the controller can be configured to control the plurality of switches (e.g., the switches 304 and 305 to be opened, and the switch 306 to be closed) so that battery bank 302 is disconnected from the battery pack voltage configurator circuit.

When the battery management system 355 controls the switches so that the battery bank 302 and the battery bank 303 are connected in series, if the battery management system 355 determines that one of the battery banks is not functioning, the battery management system 355 can change the control of the switches to only use the battery bank that is functioning. The battery pack 301 can be operated in a reduced capacity operation mode (emergency mode).

It will be appreciated that at the inverter circuit (e.g., the inverter circuit 204 of FIG. 2), adjusting the voltage (from the DC link) with the load demand (e.g., full load, partial load, low load, etc.) can reduce conduction and switching losses.

It will be appreciated that in order to transit from one configuration/mode (e.g., battery banks connected in parallel, battery banks connected in series, individual bank is used) to another, the load (e.g., the variable speed electric load) should be disconnected through, for example, the inverter circuit.

It will be appreciated that a third battery bank can be added into the battery pack 301 to provide variable output voltage/current. It will also be appreciated that the addition of new battery bank(s) can be arranged similarly as discussed above to get a whole range of voltages/currents for a whole range of speeds/torques/loads of the variable speed electric load. It will further be appreciated that the battery in the embodiments disclosed herein can provide electrical operation without a prime mover (e.g. an engine) support.

Figure 4:
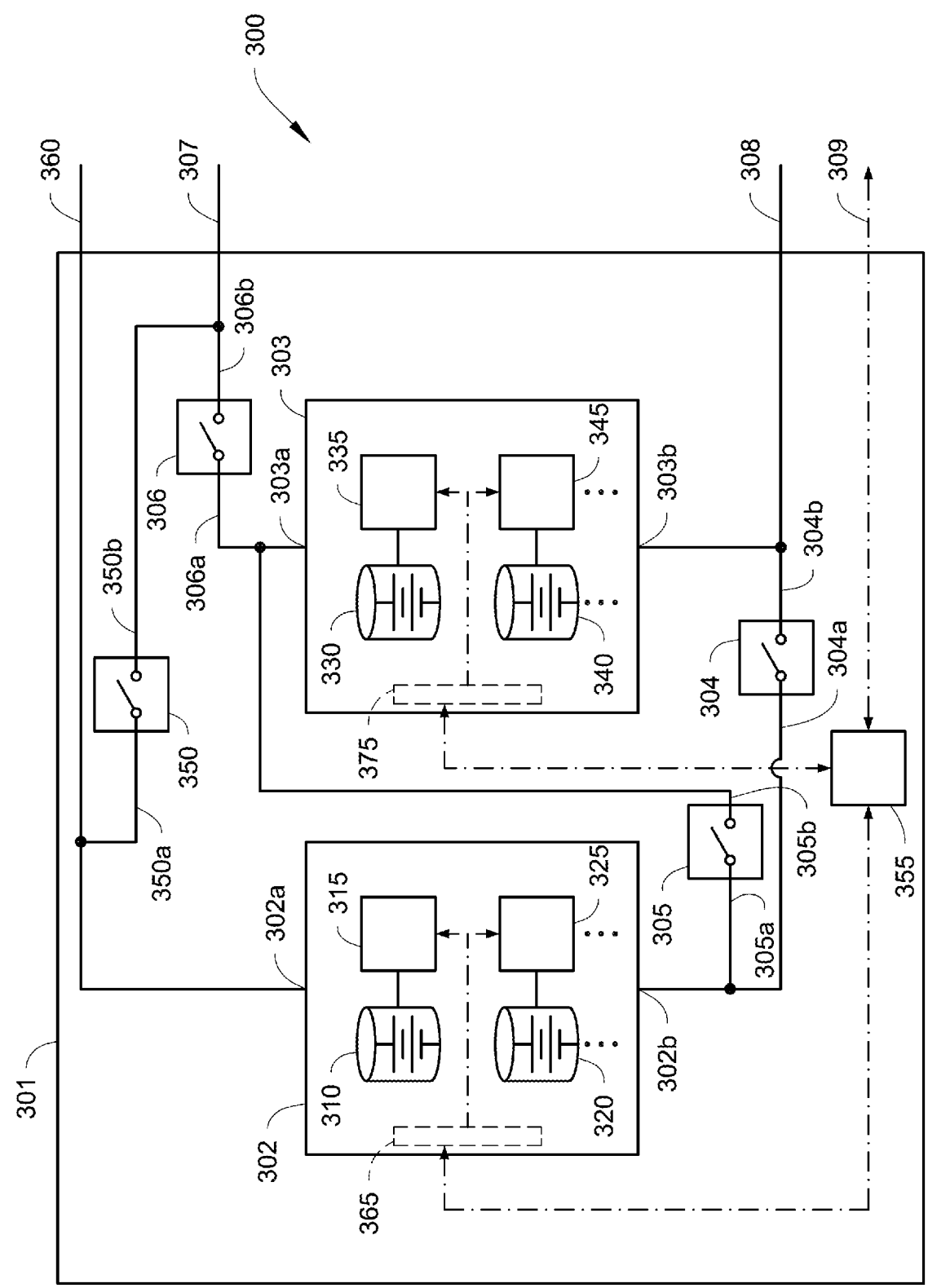
FIG. 4 illustrates a circuit diagram of a battery pack voltage steps configurator for a climate control system, according to a second embodiment.

FIG. 4 illustrates a circuit diagram of a battery pack voltage steps configurator 300 for a climate control system, according to a second embodiment. It will be appreciated that FIG. 3 can refer to a climate control system in a discharging mode and FIG. 4 can refer to the climate control system in a charging mode. It will also be appreciated that the structure and function of the elements of FIG. 4 are similar to the structure and function of the elements of FIG. 3, except as discussed below.

As shown in FIG. 4, the battery pack 301 includes a switch 350. The 350 can be a Metal-Oxide-Semiconductor Field-Effect Transistor (MOSFET), a N-type metal-oxide-semiconductor (NMOS) switch, an Insulated Gate Bipolar Transistor (IGBT), a Bipolar Junction Transistor (BJT), a solid state switch, a relay, a contactor, or the like. The battery management system 355 at the battery pack level can control the switch 350 to an open state and a close state to configure the charging of the battery pack 301 based on, for example, the message/control from a controller (not shown, such as the controller 206 of FIG. 2).

The switch 350 has two ends. The first end 350a of the switch 350 connects to the positive terminal 302a of the battery bank 302 and a charger line 360. The second end 350b of the switch 350 connects to the second end 306b of the switch 306 and a charger line 307.

It will be appreciated that a controller (e.g., the controller 206 of FIG. 2 and/or the battery management systems including 355) can configure the battery pack 301 in a charging mode and/or a discharging mode. During the charging mode, the battery pack 301 can be a Rechargeable Energy Storage System (RESS). The battery pack 301 can be charged by, for example, an ESE (e.g., an Electric Vehicle Supply Equipment (EVSE) that can be, for example, a charging station, or a charging dock, not shown). The ESE can connect to the charger line 307 and the voltage reference line 308 to charge the battery pack 301. Another ESE, when available, can connect to the charger line 360 and the voltage reference line 308 to charge the battery pack 301. The controller can configure the battery pack 301 to be charged based on the input (e.g., voltage, current, etc.) of the ESE. It will also be appreciated that during the discharging mode, line 307 serves as a voltage supply output, together with the voltage reference line 308 to provide voltage supply to load(s).

It will be appreciated that in the charging mode, the controller can be configured to establish and/or obtain a voltage range of the charger (e.g., the ESE). The battery pack can be reconfigurable (e.g., by the controller) to put the battery pack in a high voltage state so that the battery pack can work with higher voltage chargers, and the charging can be quicker (fast charging). The controller can obtain the charger parameters via e.g., programmed profile or communication with the charger. It will also be appreciated that during the charging mode, the controller can configure the battery pack 301 for a constant-current charging mode and a constant voltage charging mode. Constant-current charging typically means that the ESE supplies a relatively uniform current, regardless of the battery state of charge or temperature. Constant-current charging can help reduce and/or eliminate imbalances of battery cells and batteries connected in series. Constant-voltage charging can allow a full current of the ESE to flow into the battery until the battery reaches a pre-set voltage, and the current of the ESE will then taper down once the pre-set voltage level is reached. The combination of constant-current charging and constant-voltage charging can allow fast charging without the risk of over-charging. The parameters and timing for the constant-current charging and/or the constant-voltage charging can be obtained, e.g., by the controller, from a preprogrammed file (predetermined, pre-stored in the memory of the controller, etc.). Such parameters and timing can also be stored in the battery pack battery management system (BMS) and be communicated with the controller.

Embodiments disclosed herein can reduce requirements for a DC/DC converter responsible to manage the energy flow to the battery pack during charging. Embodiments disclosed herein can adjust internal configuration on the battery pack 301 by e.g., configuring the switches (304-306 and/or 350).

It will be appreciated that during constant current charging mode, the controller can configure the switches (304-306 and/or 350) to access independent battery banks (e.g., 302, 303) and reduce a charging current to half of the current required to charge the battery banks (e.g., 302, 303) in parallel. Such configuration can help to equalize charge level (e.g., percentage of charge) of the battery banks (e.g., 302, 303).

It will also be appreciated that during constant current charging mode, the controller can configure the switches (304-306 and/or 350) to access independent battery banks (e.g., 302, 303) and reduce a charging voltage to half the voltage required to charge the battery banks (e.g., 302, 303) when the battery banks (e.g., 302, 303) are connected in series.

After equalization of the battery banks (e.g., 302, 303), the controller can configure the battery banks (e.g., 302, 303) to be connected in parallel to charge faster, during e.g., a constant voltage mode. At this stage, state of charge of the battery banks (e.g., 302, 303) is typically in the 80%-100% range with regard to a full state of charge, requiring less current than the current in the constant current charging mode. As such, the battery banks (e.g., 302, 303) can be charged simultaneously, reducing total charge time required to manage the battery banks (e.g., 302, 303) separately.

In operation, ESE (charging station, charging dock) having multiple charging voltages can be available for charging the battery pack 301 (RESS). For example, an 800-volt ESE, a 400-volt ESE, and/or two 400-volt ESEs can be available for charging the RESS of the climate control system. Embodiments disclosed herein can optimally use various ESE, and reduce the cost of power electronic modules required to manage energy storage charging.

The controller can configure the switches (304-306, 350) to associate the battery banks (e.g., 302, 303) in series or in parallel or in independent access to meet a target output voltage or a charging profile. The controller can determine the charging profile by obtaining a configuration of the ESE via, e.g., sensors. In one embodiment, the battery banks (e.g., 302, 303) can be about 400-volt battery banks.

In operation, the battery management system 355 can communicate with the controller (such as the controller 206 of FIG. 2) and the inverter circuit (e.g. the inverter circuit 204 of FIG. 2) to obtain load information to define the battery bank association (e.g., in series, in parallel, or in independent access) for the current load condition. The communication can be achieved through, e.g., a CAN. It will be appreciated that the battery management systems (315, 325, 335, 345, 355, 365, 375, etc.) can be located in and be part of the controller. In one embodiment, the controller can be in the inverter circuit. It will also be appreciated that the battery management system 355 at the battery pack level can obtain battery information from the battery management systems at the battery module level (and/or at the battery bank level) to determine charging or discharging profiles for the battery pack 301.

Based on the current load condition (or the ESE configuration), a controller (the controller 206 of FIG. 2 or the battery management systems including 355) can be configured to control switches 304-306 to associate the battery banks (e.g., 302, 303) in series, in parallel, or in independent access, therefore changing the voltage of the battery pack 301.

When the current load condition (or the ESE configuration) requires the battery banks (e.g., 302, 303) to be associated in parallel, the controller (the controller 206 of FIG. 2 or the battery management systems including 355) can be configured to control the switch 304 to be closed, the switch 305 to be opened, and the switch 306 to be closed. In one embodiment, when the voltage of the battery bank 302 is about 400 volts and the voltage of the battery bank 303 is about 400 volts, the overall voltage of the battery pack 301 is about 400 volts when the battery banks (e.g., 302, 303) are associated in parallel.

When the current load condition (or the ESE configuration) requires the battery banks (e.g., 302, 303) to be associated in series, the controller (the controller 206 of FIG. 2 or the battery management systems including 355) can be configured to control the switch 304 to be opened, the switch 305 to be closed, and the switch 306 to be opened. In one embodiment, when the voltage of the battery bank 302 is about 400 volts and the voltage of the battery bank 303 is about 400 volts, the overall voltage of the battery pack 301 is about 800 volts when the battery banks (e.g., 302, 303) are associated in series.

When the current load condition (or the ESE configuration) requires the battery banks (e.g., 302, 303) to be associated in independent access (e.g., single battery bank access), the controller (the controller 206 of FIG. 2 or the battery management systems including 355) can be configured to control the switch 304 to be closed, the switch 305 to be opened, and the switch 306 to be opened. In such embodiment, the battery bank 302 is accessed only. In one embodiment, when the voltage of the battery bank 302 is about 400 volts and the voltage of the battery bank 303 is about 400 volts, the overall voltage of the battery pack 301 is about 400 volts when the battery banks (e.g., 302, 303) are associated in independent access (e.g., only battery bank 302 is accessed).

When the current load condition (or the ESE configuration) requires the battery banks (e.g., 302, 303) to be associated in independent access (e.g., single battery bank access), the controller (the controller 206 of FIG. 2 or the battery management systems including 355) can be configured to control the switch 304 to be opened, the switch 305 to be opened, and the switch 306 to be closed. In such embodiment, the battery bank 303 is accessed only. In one embodiment, when the voltage of the battery bank 302 is about 400 volts and the voltage of the battery bank 303 is about 400 volts, the overall voltage of the battery pack 301 is about 400 volts when the battery banks (e.g., 302, 303) are associated in independent access (e.g., only battery bank 303 is accessed).

During the charging mode (e.g., when the battery pack 301 of the battery pack voltage steps configurator 300 is connected to ESE(s)), the controller (the controller 206 of FIG. 2 or the battery management systems including 355) can be configured to control switches 304-306 to associate the battery banks (e.g., 302, 303) in series, in parallel, or in independent access, therefore changing the voltage of the battery pack 301.

When a single ESE (e.g., 800 volts ESE) is available (e.g., through the charger line 307 and the voltage reference line 308), the controller (the controller 206 of FIG. 2 or the battery management systems including 355) can be configured to control switches 304-306 to associate the battery banks (e.g., 302, 303) in series, and to control the switch 350 to be opened.

When a single ESE (e.g., 400 volts ESE, or 800 volts ESE in a 'compatibility mode' with a 400-volt ESE) is available (e.g., through the charger line 307 and the voltage reference line 308), the controller (the controller 206 of FIG. 2 or the battery management systems including 355) can be configured to control switches 304-306 to associate the battery banks (e.g., 302, 303) in independent access (e.g., only battery bank 302 is accessed or only battery bank 303 is accessed), and to control the switch 350 to be opened. In such embodiment, the battery banks (e.g., 302, 303) can be accessed one at a time to charge each battery bank depending on the requirements of the controller (the controller 206 of FIG. 2 or the battery management systems including 355) and/or the ESE.

In one embodiment, when a single ESE (e.g., 400 volts ESE, or 800 volts ESE in a 'compatibility mode' with a 400-volt ESE) is available (e.g., through the charger line 307 and the voltage reference line 308), the controller (the controller 206 of FIG. 2 or the battery management systems including 355) can be configured to control switches 304-306 to associate the battery banks (e.g., 302, 303) in parallel, and to control the switch 350 to be closed. It will be appreciated that this embodiment can be available based on the negotiation between the controller and the ESE about power availability and the battery pack demand.

When a dual ESE (e.g., two 400 volts ESEs, or one 400 volts ESE and another 800 volts ESE in a 'compatibility mode' with a 400-volt ESE) is available (e.g., one ESE through the charger line 307 and the voltage reference line 308, and another ESE through the charger line 360 and the voltage reference line 308), the controller (the controller 206 of FIG. 2 or the battery management systems including 355) can be configured to control switches 304-306 to associate the battery banks (e.g., 302, 303) in parallel, and to control the switch 350 to be opened. In such embodiment, power from separate ESE feeds to each battery bank, and the battery banks can be charged simultaneously (halving total charge time when there are two battery banks).

It will be appreciated that embodiments disclosed herein can allow usage of both 400 volts ESE and 800 volts ESE by reconfiguring the battery banks via the switches, and use the optimized/configurable battery pack(s) to optimize charging.

It will be appreciated that managing current flow (and thus energy) on battery packs would typically require a DC/DC converter to manage voltage and current levels with needed precision to properly charge battery packs, because current only flows from higher voltage to lower voltage. Embodiments disclosed herein can reduce cost (e.g., by reducing the requirement of DC/DC converters, which are typically responsible for 60% of total power electronics cost just to manage battery pack energy control) and complexity, especially if original voltage source (e.g., rectified utility power or DC Link regenerated voltage) for charging is significantly lower than the battery pack maximum voltage. The voltage difference would typically require large components to elevate the voltage and power switches capable of handling high voltage, and thus the cost of the components would increase. Embodiments disclosed herein can also reduce rated current which can impact power switches cost. Typically the higher the current (or voltage), the cost is elevated (e.g., the cost for special Printed Circuit Board layout, sensor components, and/or heat dissipation to be integrated on the converter).

Embodiments disclosed herein can support multiple charging voltage (of the ESE). Embodiments disclosed herein can enable greater use of ESE as the embodiments disclosed herein can configure the voltage of the battery pack to match the requirements of the charging infrastructure available (e.g., the requirements of the ESE). Embodiments disclosed herein can enable more universal usage of charging facilities (e.g., ESE) of different voltage levels.

Embodiments disclosed herein can use e.g., half of nominal voltage required to directly charge a battery pack, and allow charging the battery banks at maximum current when the state of charge and the battery pack cells are in a favorable condition.

Figure 5:
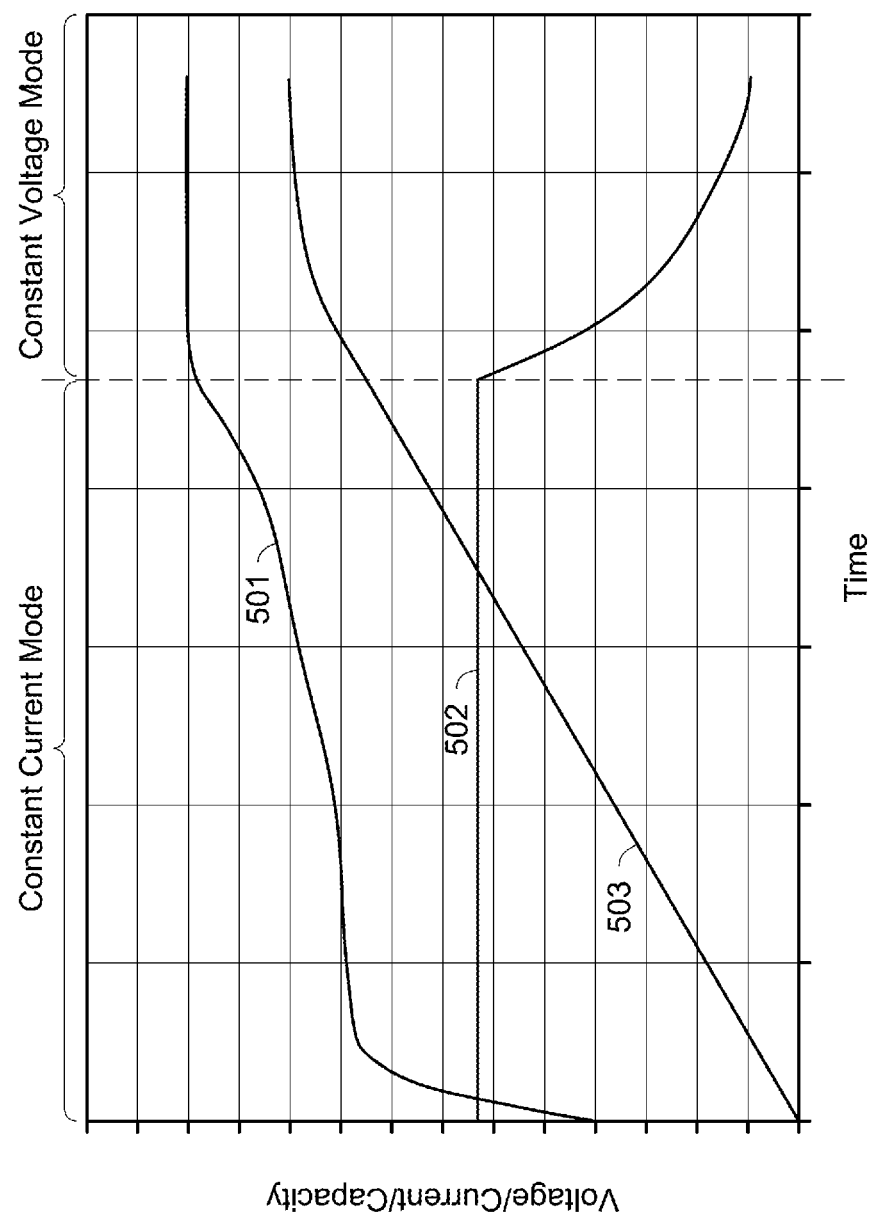
FIG. 5 illustrates a diagram of the voltage, current, and battery capacity over time when charging a battery pack for a climate control system, according to one embodiment.

FIG. 5 illustrates a diagram of the voltage, current, and battery capacity over time when charging a battery pack for a climate control system, according to one embodiment. The battery pack can be, e.g., battery pack 301 of FIGS. 3 and 4.

As shown in FIG. 5, line 501 represents the charging voltage over time during the constant-current charging mode and the constant-voltage charging mode. Line 502 represents the charging current over time during the constant-current charging mode and the constant-voltage charging mode. Line 503 represents the battery capacity (energy stored in the battery) over time during the constant-current charging mode and the constant-voltage charging mode.

It will be appreciated that during constant current charging mode, the controller (the controller 206 of FIG. 2 or the battery management systems including 355) can configure the switches (304-306 and/or 350 of FIGS. 3 and 4) to associate the battery banks (e.g., 302, 303 of FIGS. 3 and 4) to help to equalize the charge level (e.g., percentage of charge) of the battery banks (e.g., 302, 303).

After equalization of the battery banks (e.g., 302, 303), the controller can configure the battery banks (e.g., 302, 303) to be connected in parallel for faster charging during e.g., a constant voltage mode. At this stage, state of charge of the battery banks (e.g., 302, 303) is typically in the 80%-100% range with regarding to a full state of charge, requiring less current than the current in the constant current charging mode. As such, the battery banks (e.g., 302, 303) can be charged simultaneously, reducing total charge time required to manage the battery banks (e.g., 302, 303) separately.

Figure 6:
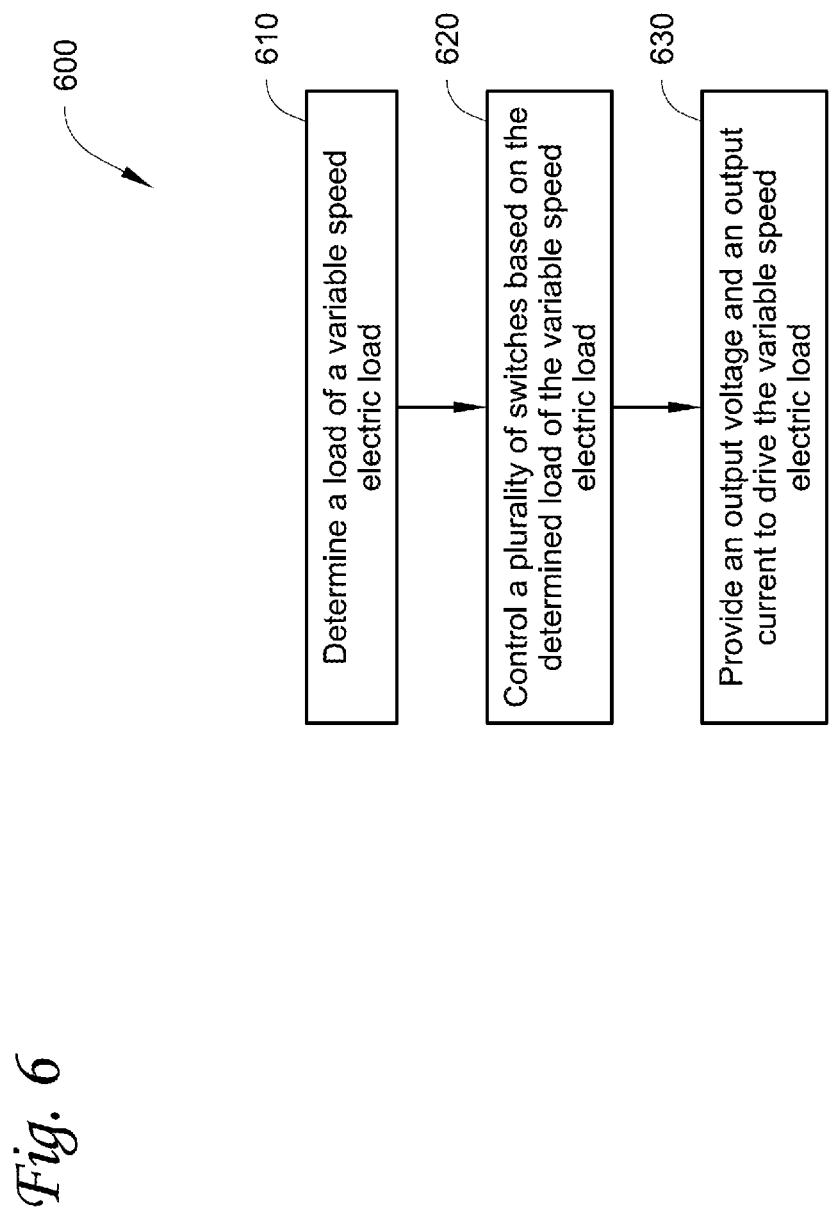
FIG. 6 is a flow chart illustrating a method for configuring battery pack voltage steps for a transport vehicle having a climate control system, according to a first embodiment.

FIG. 6 is a flow chart illustrating a method 600 for configuring battery pack voltage steps for a transport vehicle having a climate control system, according to a first embodiment.

The method 600 begins at 610 where a controller (e.g., the controller 206 of FIG. 2) is configured to determine a load of a variable speed electric load (e.g., the variable speed electric load 205 of FIG. 2). It will be appreciated that various pressures (e.g., suction and/or discharge pressure of the compressor) and temperatures (e.g., temperature at the suction and/or discharge port of the compressor) of the transport climate control system can be used to determine the load of the compressor (or mass flow required to operate the transport climate control system). It will also be appreciated that the load of the compressor can be determined by measuring the current drawn by the compressor at a particular speed. If more power is needed because the current drawn is getting higher at the speed, the voltage can be increased and speed can be increased to lower the current drawn. The method 600 then proceeds to 620.

At 620, the controller is configured to control a plurality of switches (e.g., 304-306 and/or 350 of FIGS. 3 and/or 4) based on the determined load of the variable speed electric load. It will be appreciated that the control of the plurality of switches based on the determined load of the variable speed electric load are described in detail in the description of FIGS. 3 and/or 4.

For example, when the load is determined to be a first load (e.g., a high speed and low torque/low load requirement as described in FIG. 3), the controller is configured to control the plurality of switches so that the first battery bank (e.g., 302 of FIG. 3) connects to the second battery bank (e.g., 303 of FIG. 3) in series and the output voltage is the sum of the first voltage (the voltage of 302 of FIG. 3) and the second voltage (the voltage of 303 of FIG. 3).

It will be appreciated that when one of the first battery bank or the second battery bank malfunctions, the controller is configured to control the plurality of switches so that the malfunctioned battery bank is disconnected from the battery pack voltage configurator circuit (e.g., the battery pack voltage steps configurator 300 of FIGS. 3 and/or 4).

When the load is determined to be a second load (e.g., a low speed and high torque/high load requirement as described in FIG. 3), the controller is configured to control the plurality of switches so that the first battery bank connects to the second battery bank in parallel and the output voltage is first voltage or the second voltage.

When the load is determined to be a third load (e.g., a low speed and low torque/low load requirement as described in FIG. 3), the controller is configured to control the plurality of switches so that the first battery bank is disconnected from the battery pack voltage configurator circuit and the output voltage is the second voltage. In another embodiment, when the load is determined to be the third load, the controller is configured to control the plurality of switches so that the second battery bank is disconnected from the battery pack voltage configurator circuit and the output voltage is the first voltage.

The method 600 then proceeds to 630. At 630, the battery pack voltage configurator circuit is configured to provide an output voltage and an output current to drive the variable speed electric load. The output voltage and the output current vary in magnitude based on the control of the plurality of switches. See e.g., the description of FIGS. 3 and/or 4.

FIG. 7 is a flow chart illustrating a method for configuring battery pack voltage steps for a transport vehicle having a climate control system, according to a second embodiment.

The method 700 begins at 710 where a controller (e.g., the controller 206 of FIG. 2) is configured to determine a voltage level of a power source (e.g., the power source 201 of FIG. 2). The power source can be an ESE, a utility power source, a charger, an EVSE, etc. The method 700 then proceeds to 720.

At 720, the controller is configured to control a plurality of switches (e.g., 304-306 and/or 350 of FIGS. 3 and/or 4)

based on the voltage level of the power source (to provide e.g., an optimum battery pack configuration for charging the battery pack based on the determined voltage level of the power source). It will be appreciated that the control of the plurality of switches based on the determined voltage level of the power source are described in detail in the description of FIGS. 3 and/or 4.

For example, when the voltage level of the power source (the charging voltage) is determined to be/match a sum of the first voltage (the voltage of 302 of FIG. 3) and the second voltage (the voltage of 303 of FIG. 3), the controller is configured to control the plurality of switches so that the first battery bank (e.g., 302 of FIG. 3) connects to the second battery bank (e.g., 303 of FIG. 3) in series for being charged.

It will be appreciated that when one of the first battery bank or the second battery bank malfunctions, the controller is configured to control the plurality of switches so that the malfunctioned battery bank is disconnected from the battery pack voltage configurator circuit (e.g., the battery pack voltage steps configurator 300 of FIGS. 3 and/or 4).

When the voltage level of the power source is determined to be the first voltage (the voltage of 302 of FIG. 3) and the first voltage is the same as the second voltage (the voltage of 303 of FIG. 3), or when the voltage level of the power source is determined to be the greatest voltage of the first voltage (the voltage of 302 of FIG. 3) and the second voltage (the voltage of 303 of FIG. 3), the controller is configured to control the plurality of switches so that the first battery bank connects to the second battery bank in parallel.

When the voltage level of the power source is determined to be the first voltage (the voltage of 302 of FIG. 3) and the first voltage is less than the second voltage (the voltage of 303 of FIG. 3), the controller is configured to control the plurality of switches so that the second battery bank is disconnected from the battery pack voltage configurator circuit. In another embodiment, when the voltage level of the power source is determined to be the second voltage (the voltage of 303 of FIG. 3) and the second voltage is less than the first voltage (the voltage of 302 of FIG. 3), the controller is configured to control the plurality of switches so that the first battery bank is disconnected from the battery pack voltage configurator circuit.

The method 700 then proceeds to 730. At 730, the battery pack voltage configurator circuit is configured to provide a configuration optimized to be charged by the voltage level of the power source (the charging voltage). See e.g., the description of FIGS. 3 and/or 4.

It will be appreciated that the embodiments disclosed herein can provide efficiency and provide optimal/variable voltage and/or current to operate for different operational requirements. The embodiments disclosed herein can also optimize battery life and reduce the number of overall charging/discharging cycles in each battery bank/module/cell. The embodiments disclosed herein can further reduce the total number of switches (which can be expensive) used in the system. Also the embodiments disclosed herein can reduce the total number of (and the associated cost, size, weight, ingress protection enclosure, battery management systems(s), etc.) battery cell(s)/module(s)/bank(s) used in the system while still providing desired voltage/current.

ASPECTS

It is to be appreciated that any of aspects 1-9 can be combined with any of aspects 10-15, 16, and 17 and that any of aspects 10-15 can be combined with any of aspects 16 and 17. Any of aspects 18-26 can be combined with any of aspects 27-32, 33, and 34 and that any of aspects 27-32 can be combined with any of aspects 33 and 34.

Aspect 1. A transport climate control system for use in a transport vehicle, the system comprising:
an electric load;
a controller configured to determine a load of the electric load; and
a battery pack voltage configurator circuit that includes:
a first battery bank providing a first voltage and a first current,
a second battery bank providing a second voltage and a second current, and
a plurality of switches,
wherein the controller is configured to control the plurality of switches based on the determined load of the electric load,
wherein the battery pack voltage configurator circuit is configured to provide an output voltage and an output current to drive the electric load, the output voltage and the output current vary in magnitude based on the control of the plurality of switches.

Aspect 2. The transport climate control system according to aspect 1, wherein when the load is determined to be a first load, the controller is configured to control the plurality of switches so that the first battery bank connects to the second battery bank in series and the output voltage is the sum of the first voltage and the second voltage.

Aspect 3. The transport climate control system according to aspect 2, wherein when one of the first battery bank or the second battery bank malfunctions, the controller is configured to control the plurality of switches so that the malfunctioned battery bank is disconnected from the battery pack voltage configurator circuit.

Aspect 4. The transport climate control system according to aspect 1, wherein when the load is determined to be a second load, the controller is configured to control the plurality of switches so that the first battery bank connects to the second battery bank in parallel and the output voltage is the first voltage or the second voltage.

Aspect 5. The transport climate control system according to aspect 1, wherein when the load is determined to be a third load, the controller is configured to control the plurality of switches so that the first battery bank is disconnected from the battery pack voltage configurator circuit and the output voltage is the second voltage.

Aspect 6. The transport climate control system according to aspect 1, wherein when the load is determined to be a third load, the controller is configured to control the plurality of switches so that the second battery bank is disconnected from the battery pack voltage configurator circuit and the output voltage is the first voltage.

Aspect 7. The transport climate control system according to any one of aspects 1-6, wherein the first voltage and the second voltage have the same voltage value, and the first current and the second current have the same current value.

Aspect 8. The transport climate control system according to any one of aspects 1-7, further comprising:
an inverter for converting the output voltage to an AC voltage,
wherein the electric load is driven by the AC voltage.

Aspect 9. The transport climate control system according to any one of aspects 1-8, wherein the electric load is a multi-speed AC-driven compressor.

Aspect 10. A method for configuring battery pack voltage steps for a transport vehicle having a climate control system, the system having an electric load; a controller; and a battery pack voltage configurator circuit, the battery pack voltage configurator circuit having a first battery bank providing a first voltage and a first current, a second battery bank providing a second voltage and a second current, and a plurality of switches, the method comprising:

determining a load of the electric load;

controlling the plurality of switches based on the determined load of the electric load; and the battery pack voltage configurator circuit providing an output voltage and an output current to drive the electric load, wherein the output voltage and the output current vary in magnitude based on the control of the plurality of switches.

Aspect 11. The method according to aspect 10, further comprising:

when the load is determined to be a first load, controlling the plurality of switches so that the first battery bank connects to the second battery bank in series and the output voltage is the sum of the first voltage and the second voltage.

Aspect 12. The method according to aspect 11, further comprising:

when one of the first battery bank or the second battery bank malfunctions, controlling the plurality of switches so that the malfunctioned battery bank is disconnected from the battery pack voltage configurator circuit.

Aspect 13. The method according to aspect 10, further comprising:

when the load is determined to be a second load, controlling the plurality of switches so that the first battery bank connects to the second battery bank in parallel and the output voltage is first voltage or the second voltage.

Aspect 14. The method according to aspect 10, further comprising:

when the load is determined to be a third load, controlling the plurality of switches so that the first battery bank is disconnected from the battery pack voltage configurator circuit and the output voltage is the second voltage.

Aspect 15. The method according to aspect 10, further comprising:

when the load is determined to be a third load, controlling the plurality of switches so that the second battery bank is disconnected from the battery pack voltage configurator circuit and the output voltage is the first voltage.

Aspect 16. A transport climate control system for use in a transport vehicle, the system comprising:

a controller configured to determine a charging profile based on a configuration of an electric supply equipment (ESE);

a battery pack voltage configurator circuit that includes:

a first battery bank, a second battery bank, and a plurality of switches, wherein the controller is configured to control the plurality of switches based on the determined charging profile, wherein the ESE is configured to charge the battery pack voltage configurator circuit.

Aspect 17. A transport climate control system for use in a transport vehicle, the system comprising:

a controller configured to determine an electrical supply voltage of an electric supply equipment (ESE); and a battery pack voltage configurator circuit that includes:

a first battery bank, a second battery bank, and a plurality of switches, wherein the controller is configured to control the plurality of switches based on the determined electrical supply voltage of the ESE, wherein the battery pack voltage configurator circuit is configured to provide a pack voltage and a pack current to charge the first battery bank and/or the second battery bank, the pack voltage and the pack current vary in magnitude based on the control of the plurality of switches.

Aspect 18. An electrically powered accessory, comprising:

an electric load;

a controller configured to determine a load of the electric load; and a battery pack voltage configurator circuit that includes:

a first battery bank providing a first voltage and a first current, a second battery bank providing a second voltage and a second current, and a plurality of switches, wherein the controller is configured to control the plurality of switches based on the determined load of the electric load, wherein the battery pack voltage configurator circuit is configured to provide an output voltage and an output current to drive the electric load, the output voltage and the output current vary in magnitude based on the control of the plurality of switches.

Aspect 19. The electrically powered accessory according to aspect 18, wherein when the load is determined to be a first load, the controller is configured to control the plurality of switches so that the first battery bank connects to the second battery bank in series and the output voltage is the sum of the first voltage and the second voltage.

Aspect 20. The electrically powered accessory according to aspect 19, wherein when one of the first battery bank or the second battery bank malfunctions, the controller is configured to control the plurality of switches so that the malfunctioned battery bank is disconnected from the battery pack voltage configurator circuit.

Aspect 21. The electrically powered accessory according to aspect 18, wherein when the load is determined to be a second load, the controller is configured to control the plurality of switches so that the first battery bank connects to the second battery bank in parallel and the output voltage is the first voltage or the second voltage.

Aspect 22. The electrically powered accessory according to aspect 18, wherein when the load is determined to be a third load, the controller is configured to control the plurality of switches so that the first battery bank is disconnected from the battery pack voltage configurator circuit and the output voltage is the second voltage.

Aspect 23. The electrically powered accessory according to aspect 18, wherein when the load is determined to be a third load, the controller is configured to control the plurality of switches so that the second battery bank is disconnected from the battery pack voltage configurator circuit and the output voltage is the first voltage.

Aspect 24. The electrically powered accessory according to any one of aspects 18-23, wherein the first voltage and the second voltage have the same voltage value, and the first current and the second current have the same current value.

Aspect 25. The electrically powered accessory according to any one of aspects 18-24, further comprising:

an inverter for converting the output voltage to an AC voltage, wherein the electric load is driven by the AC voltage.

Aspect 26. The electrically powered accessory according to any one of aspects 18-25, wherein the electric load is a multi-speed AC-driven compressor.

Aspect 27. A method for configuring battery pack voltage steps for an electrically powered accessory, the electrically powered accessory having an electric load; a controller; and a battery pack voltage configurator circuit, the battery pack voltage configurator circuit having a first battery bank providing a first voltage and a first current, a second battery bank providing a second voltage and a second current, and a plurality of switches, the method comprising:

determining a load of the electric load;

controlling the plurality of switches based on the determined load of the electric load; and the battery pack voltage configurator circuit providing an output voltage and an output current to drive the electric load, wherein the output voltage and the output current vary in magnitude based on the control of the plurality of switches.

Aspect 28. The method according to aspect 27, further comprising:

when the load is determined to be a first load, controlling the plurality of switches so that the first battery bank connects to the second battery bank in series and the output voltage is the sum of the first voltage and the second voltage.

Aspect 29. The method according to aspect 28, further comprising:

when one of the first battery bank or the second battery bank malfunctions, controlling the plurality of switches so that the malfunctioned battery bank is disconnected from the battery pack voltage configurator circuit.

Aspect 30. The method according to aspect 27, further comprising:

when the load is determined to be a second load, controlling the plurality of switches so that the first battery bank connects to the second battery bank in parallel and the output voltage is first voltage or the second voltage.

Aspect 31. The method according to aspect 27, further comprising:

when the load is determined to be a third load, controlling the plurality of switches so that the first battery bank is disconnected from the battery pack voltage configurator circuit and the output voltage is the second voltage.

Aspect 32. The method according to aspect 27, further comprising:

when the load is determined to be a third load, controlling the plurality of switches so that the second battery bank is disconnected from the battery pack voltage configurator circuit and the output voltage is the first voltage.

Aspect 33. An electrically powered accessory comprising:

a controller configured to determine a charging profile based on a configuration of an electric supply equipment (ESE);

a battery pack voltage configurator circuit that includes:
a first battery bank,
a second battery bank, and
a plurality of switches, wherein the controller is configured to control the plurality of switches based on the determined charging profile, wherein the ESE is configured to charge the battery pack voltage configurator circuit.

Aspect 34. An electrically powered accessory comprising:

a controller configured to determine an electrical supply voltage of an electric supply equipment (ESE); and a battery pack voltage configurator circuit that includes:
a first battery bank,
a second battery bank, and
a plurality of switches, wherein the controller is configured to control the plurality of switches based on the determined electrical supply voltage of the ESE, wherein the battery pack voltage configurator circuit is configured to provide a pack voltage and a pack current to charge the first battery bank and/or the second battery bank, the pack voltage and the pack current vary in magnitude based on the control of the plurality of switches.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A transport climate control system for use in a transport vehicle, the system comprising:

a variable speed electric load;

a controller configured to determine a load of the electric load; and a battery pack voltage configurator circuit that includes:
a first battery bank providing a first voltage and a first current,
a second battery bank providing a second voltage and a second current, each of the first battery bank and the second battery bank including a plurality of battery modules, each of the battery modules having a battery management system configured to manage a plurality of battery cells of each of the battery modules, and
a plurality of switches, wherein the controller is configured to control the plurality of switches based on the determined load of the electric load, wherein the battery pack voltage configurator circuit is configured to provide an output voltage and an output current to drive the electric load, the output voltage and the output current vary in magnitude based on the control of the plurality of switches, wherein the controller is configured to communicate with the battery management system of each of the battery modules to determine a status of the first battery bank and the second battery bank, wherein the controller is further configured to control the plurality of switches based on the status of the first battery bank and the second battery bank to provide the output voltage and the output current based on the determined load of the electric load, wherein the determined load has one of a high speed and low torque requirement, a low speed and high torque requirement, or a low speed and low torque requirement, wherein the controller is configured to control the plurality of switches based on the status of the first battery bank and the second battery bank to provide the output voltage and the output current to correspond to the one of the high speed and low torque requirement, the low speed and high torque requirement, or the low speed and low torque requirement.

2. The transport climate control system according to claim 1, wherein when the load is determined to be a first load, the controller is configured to control the plurality of switches so that the first battery bank connects to the second battery bank in series and the output voltage is the sum of the first voltage and the second voltage.

3. The transport climate control system according to claim 2, wherein when one of the first battery bank or the second battery bank malfunctions, the controller is configured to control the plurality of switches so that the malfunctioned battery bank is disconnected from the battery pack voltage configurator circuit.

4. The transport climate control system according to claim 1, wherein when the load is determined to be a second load, the controller is configured to control the plurality of switches so that the first battery bank connects to the second battery bank in parallel and the output voltage is the first voltage or the second voltage.

5. The transport climate control system according to claim 1, wherein when the load is determined to be a third load, the controller is configured to control the plurality of switches so that the first battery bank is disconnected from the battery pack voltage configurator circuit and the output voltage is the second voltage.

6. The transport climate control system according to claim 1, wherein when the load is determined to be a third load, the controller is configured to control the plurality of switches so that the second battery bank is disconnected from the battery pack voltage configurator circuit and the output voltage is the first voltage.

7. The transport climate control system according to claim 1, wherein the first voltage and the second voltage have the same voltage value, and the first current and the second current have the same current value.

8. The transport climate control system according to claim 1, further comprising:
an inverter for converting the output voltage to an AC voltage, wherein the electric load is driven by the AC voltage.

9. The transport climate control system according to claim 1, wherein the electric load is a multi-speed AC-driven compressor.

10. A method for configuring battery pack voltage steps for a transport vehicle having a climate control system, the system having a variable speed electric load; a controller; and a battery pack voltage configurator circuit, the battery pack voltage configurator circuit having a first battery bank providing a first voltage and a first current, a second battery bank providing a second voltage and a second current, and a plurality of switches, each of the first battery bank and the second battery bank including a plurality of battery modules, each of the battery modules having a battery management system configured to manage a plurality of battery cells of each of the battery modules, the method comprising:
determining a load of the electric load;
controlling the plurality of switches based on the determined load of the electric load; and
the battery pack voltage configurator circuit providing an output voltage and an output current to drive the electric load,
wherein the output voltage and the output current vary in magnitude based on the control of the plurality of switches,
wherein the controller is configured to communicate with the battery management system of each of the battery modules to determine a status of the first battery bank and the second battery bank,
wherein the controller is further configured to control the plurality of switches based on the status of the first battery bank and the second battery bank to provide the output voltage and the output current based on the determined load of the electric load,
wherein the determined load has one of a high speed and low torque requirement, a low speed and high torque requirement, or a low speed and low torque requirement,
wherein the controller is configured to control the plurality of switches based on the status of the first battery bank and the second battery bank to provide the output voltage and the output current to correspond to the one of the high speed and low torque requirement, the low speed and high torque requirement, or the low speed and low torque requirement.

11. The method according to claim 10, further comprising:
when the load is determined to be a first load, controlling the plurality of switches so that the first battery bank connects to the second battery bank in series and the output voltage is the sum of the first voltage and the second voltage.

12. The method according to claim 11, further comprising:
when one of the first battery bank or the second battery bank malfunctions, controlling the plurality of switches so that the malfunctioned battery bank is disconnected from the battery pack voltage configurator circuit.

13. The method according to claim 10, further comprising:
when the load is determined to be a second load, controlling the plurality of switches so that the first battery bank connects to the second battery bank in parallel and the output voltage is the first voltage or the second voltage.

14. The method according to claim 10, further comprising:
when the load is determined to be a third load, controlling the plurality of switches so that the first battery bank is disconnected from the battery pack voltage configurator circuit and the output voltage is the second voltage.

15. The method according to claim 10, further comprising:
when the load is determined to be a third load, controlling the plurality of switches so that the second battery bank is disconnected from the battery pack voltage configurator circuit and the output voltage is the first voltage.

* * * * *